United States Patent
Iyama

(10) Patent No.: US 6,856,467 B2
(45) Date of Patent: Feb. 15, 2005

(54) IMAGE PICKUP SYSTEM

(75) Inventor: Noriyuki Iyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/352,063

(22) Filed: Jan. 28, 2003

(65) Prior Publication Data

US 2003/0169509 A1 Sep. 11, 2003

(30) Foreign Application Priority Data

Jan. 29, 2002 (JP) ........................................ 2002-019760

(51) Int. Cl.$^7$ ............................................. G01B 15/14
(52) U.S. Cl. ...................................... 359/682; 359/680
(58) Field of Search ................................ 359/680, 682, 359/689

(56) References Cited

U.S. PATENT DOCUMENTS

2003/0169509 A1 * 9/2003 Iyama ........................ 359/680

FOREIGN PATENT DOCUMENTS

| JP | 11-052246 | 2/1999 |
| JP | 11-258507 | 9/1999 |
| JP | 11-287953 | 10/1999 |
| JP | 2000-275520 | 6/2000 |
| JP | 2000-267009 | 9/2000 |
| JP | 2003121740 A | * 4/2003 | ........... G02B/15/20 |
| JP | 2003131133 A | * 5/2003 | ........... G02B/15/20 |

* cited by examiner

Primary Examiner—David N. Spector
(74) Attorney, Agent, or Firm—Kenyon & Kenyon

(57) ABSTRACT

The invention has for its object to use a zoom system that comprises a reduced number of lens elements, is compact and simplified, and has high image-formation capability, thereby achieving thorough size reductions in video cameras or digital cameras. A zoom lens for use on an image pickup system comprises a first lens group G1 negative power comprising an aspheric negative lens element and a positive lens element, a second lens group G2 comprising a positive single lens element, a positive doublet wherein a positive and a negative lens element are cemented together in this order and which is in a meniscus form convex toward an object side of the zoom lens and a positive single lens element, wherein two or more surfaces except the cementing surface of the doublet are each defined by an aspheric surface, and a third lens group G3 comprising one positive lens component. For zooming from the wide-angle end to the telephoto end of the zoom lens, the second lens group G2 moves only toward the object side of the zoom lens, and the third lens group G3 moves in a locus different from that of the second lens group G2. For focusing, the third lens group G3 moves. Condition (1) for the shape factor of the object side-positive lens element in the second lens group G2 and condition (2) for the magnification of the second lens group G2 are satisfied.

19 Claims, 13 Drawing Sheets

C : Cyan   M : Magenta
Ye : Yellow   G : Green

IMAGE PICKUP SYSTEM

This application claims benefits of Japanese Application No. 2002-19760 filed in Japan on Jan. 29, 2002, the contents of which are incorporated by this reference.

BACKGROUND OF THE INVENTION

The present invention relates generally to an image pickup system, and more particularly to an electronic image pickup system such as video or digital cameras, the depth dimension of which is diminished by providing some contrivance to an optical system portion such as a zoom lens. According to the present invention, the zoom lens is also designed to be capable of rear focusing.

In recent years, digital cameras (electronic cameras) have received attention as cameras of the next generation, an alternative to silver-halide 35 mm-film (usually called Leica format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while high image quality is ensured. The gravest bottleneck in diminishing the depth dimension of cameras is the thickness of an optical system, especially a zoom lens system from the surface located nearest to its object side to an image pickup plane. To make use of a collapsible lens mount that allows the optical system to be taken out of a camera body for phototaking and received therein for carrying now becomes mainstream.

However, the thickness of an optical system received in a collapsible lens mount varies largely with the lens type or filters used. Especially in the case of a so-called+precedent type zoom lens wherein a lens group having positive refracting power is positioned nearest to its object side, the thickness of each lens element and dead space are too large to set such requirements as zoom ratios and F-numbers at high values; in other words, the optical system does not become thin as expected, even upon received in the lens mount (JP-A 11-258507). A –precedent type zoom lens, especially of two or three-group construction is advantageous in this regard. However, this type zoom lens, too, does not become slim upon received in a collapsible lens mount, even when the lens positioned nearest to the object side is formed of a positive lens (JP-A 11-52246), because the lens groups are each composed of an increased number of lens elements, and the thickness of lens elements is large. Among zoom lenses known so far in the art, those set forth typically in JP-A's 11-287953, 2000-267009 and 2000-275520 are suitable for use with electronic image pickup systems with improved image-formation capabilities including zoom ratios, angles of view and F-numbers, and may possibly be reduced in thickness upon received in collapsible lens mounts.

To make the first lens group thin, it is preferable to make the entrance pupil position shallow; however, the magnification of the second lens group must be increased to this end. For this reason, some considerable load is applied on the second lens group. Thus, it is not only difficult to make the second lens group itself thin but it is also difficult to make correction for aberrations. In addition, the influence of production errors grows. Thickness and size reductions may be achieved by making the size of an image pickup device small. To ensure the same number of pixels, however, the pixel pitch must be diminished and insufficient sensitivity must be covered by the optical system. The same goes true for the influence of diffraction.

To obtain a camera body whose depth dimension is reduced, a rear focusing mode wherein the rear lens group is moved for focusing is effective in view of the layout of a driving system. It is then required to single out an optical system less susceptible to aberration fluctuations upon rear focusing.

SUMMARY OF THE INVENTION

In view of such problems as referred to above, the primary object of the invention is to thoroughly slim down an image pickup system by singling out a zoom mode or zoom construction wherein a reduced number of lens elements are used to reduce the size of a zoom lens and simplify the layout thereof and stable yet high image-formation capabilities are kept over an infinite-to-nearby range compatible with 4,000,000 or more pixels, and optionally making lens elements thin thereby reducing the total thickness of each lens group and slimming down a zoom lens thoroughly by selection of filters.

According to the present invention, the aforesaid object is achievable by the provision of an image pickup system comprising a zoom lens and an image pickup plane located on an image side of the zoom lens, wherein:

said zoom lens comprises, in order from an object side of said zoom lens, a first lens group of negative refracting power comprising a negative lens element having an aspheric surface and a positive lens element, a second lens group comprising, in order from an object side thereof, a positive single lens element L21, a doublet component of positive refracting power wherein a positive lens element L22 and a negative lens element L23 are cemented together in this order and which is in a meniscus form convex on the object side and a positive single lens element L24, wherein two or more surfaces except the cementing surface in said doublet component are each defined by an aspheric surface, and a third lens group composed of one positive lens component, wherein:

for zooming from a wide-angle end to a telephoto end of said zoom lens upon focused on an object point at infinity, said second lens group moves only toward the object side, said third lens group moves in a locus different from that of said second lens group, said third lens moves for focusing, and the following conditions (1) and (2) are satisfied:

$$-0.4 < (R_{21F} + R_{21R})/(R_{21F} - R_{21R}) < 0.3 \quad (1)$$

$$1.4 < -\beta_{2T} < 2.1 \quad (2)$$

where $R_{21F}$ is the axial radius of curvature of the object side-surface of the single lens element L21 in the second lens group $R_{21R}$ is the axial radius of curvature of the image side-surface of the single lens element L21 in the second lens group, and $\beta_{2T}$ is the magnification of the second lens group at the telephoto end upon focused on an object point at infinity.

Why the aforesaid arrangement is used herein, and how it works is explained.

As described above, the image pickup system of the invention comprising a zoom lens and an image pickup plane located on the image side of the zoom lens. The zoom lens comprises, in order from its object side, a first lens group of negative refracting power comprising a negative lens element having an aspheric surface and a positive lens element, a second lens group comprising, in order from its object side, a triplet component of positive refracting power wherein a positive single lens element L21, a positive lens element L22 and a negative lens element L23 are cemented together in this order and which is in a meniscus form convex on the object side and a positive single lens element L24, wherein two or more surfaces except the cementing surface, for instance, the object and image side-surfaces of the positive single lens element L21 and the object side-surface of the positive lens element L22, are each defined by an aspheric surface, and a third lens group composed of one positive lens component. For zooming from the wide-angle end to the telephoto end of the zoom lens upon focused on an object point at infinity, the second lens group moves only toward the object side, the third lens group moves in a locus different from that of the second lens group, and third lens moves for focusing.

In the present disclosure, the term "doublet" should be understood to comprise a plurality of lens elements wherein a lens element formed of a single medium is thought of as one unit, and the "lens component" should be understood to refer to a lens group with no air separation therein, i.e., a single lens or a cemented lens.

For reductions in the size of a two-group zoom lens of −+ construction commonly used as the zoom lens for long-standing silver-halide film cameras, it is preferable to increase the magnification of the positive rear group (the second lens group) at each focal length. To this end, it is already well known to locate an additional positive lens component as the third lens group on the image side of the second lens group, wherein the spacing between the second lens group and the third lens group is varied for zooming from the wide-angle end to the telephoto end. The third lens group has also the possibility of being used for focusing.

To attain the object of the invention, i.e., to diminish the total thickness of a lens portion upon received in a collapsible mount yet perform focusing at the third lens group, of importance is the ability of the second lens group in particular to correct aberrations, thereby reducing fluctuations of off-axis aberrations inclusive of astigmatism.

For focusing at the third lens group, aberration fluctuations become a problem. However, the incorporation of an aspheric surface in the third lens group in an amount than required is not preferable. This is because, to take advantage of that aspheric surface, astigmatism remaining at the first and second lens groups must be corrected at the third lens group. If, in this state, the third lens group moves for focusing, then aberrations are out of balance. Accordingly, when focusing is performed at the third lens group, astigmatism must be eradiated at the first and second lens group all over the zoom range.

Thus, the third lens group is constructed of a spherical lens component or a reduced amount of asphericity, an aperture stop is located on the object side of the second lens group, and the second lens group is comprised of, in order from its object side, a positive lens element, a doublet component in order of +− and a positive lens element with a plurality of aspheric surfaces used locally for surfaces in the second lens group, which surfaces are located nearer to the object side.

For the same reason, an aspheric surface is introduced in the negative lens element in the first lens group, too.

Since the diameter of the front lens in this type can substantially be kept small, it is preferable to make the aperture stop integral with the second lens group (in the examples of the invention given later, the aperture stop is located just before the second lens group in a one-piece form, because not only is mechanical simplification achieved but also there is little or no dead space upon the lens portion received in a collapsible mount with a reduced F-number difference between the wide-angle end and the telephoto end. The negative lens element in the second lens group functions to cancel the coefficients of spherical aberration and coma produced at the positive lens elements. In addition, that negative lens element, because of being largely decentered relative to the positive lens elements, is cemented to the positive lens element having a substantial surface to be corrected, so that aberrations by relative decentration are reduced. Preferably in this case, as much aberrations as possible should be canceled within the doublet component, so that sensitivity to relative decentration is kept low. This can in turn keep low sensitivity to relative decentration of the doublet component with respect to the remaining single positive lens component.

Moreover, since a plurality of aspheric surfaces are introduced on the object side of the second lens group, it is preferable to determine the shape factor of the object side-positive lens element in the vicinity of the optical axis according to the following condition (1):

$$-0.4<(R_{21F}+R_{21R})/(R_{21F}-R_{21R})<0.3 \qquad (1)$$

where $R_{21F}$ is the axial radius of curvature of the object side-surface of the single lens element L21 in the second lens group, and $R_{21R}$ is the axial radius of curvature of the image side-surface of the single lens element L21 in the second lens group.

Since the positive lens element on the object side of the second lens group fundamentally produces large spherical aberrations, it is first preferable to bring its shape approximate to the minimum solution of spherical aberrations with the spherical component. Any deviation from the upper limit of 0.3 and the lower limit of −0.4 to condition (1) makes correction of spherical aberrations difficult even when a plurality of aspheric surfaces are introduced on the object side of the second lens group.

More preferably, $$-0.2<(R_{21F}+R_{21R})/(R_{21F}-R_{21R})<0.25 \qquad (1)'$$

Most preferably, $$-0.1<(R_{21F}+R_{21R})/(R_{21F}-R_{21R})<0.2 \qquad (1)''$$

Apart from correction of aberrations, the key point for size reductions is to make the magnification of the second lens group higher than that of a conventional negative group-precedent zoom lens.

$$1.4<-\beta_{2T}<2.1 \qquad (2)$$

Here $\beta_{2T}$ is the magnification of the second lens group at the telephoto end upon focused on an object point at infinity.

As the lower limit of 1.4 to condition (2) is not reached, the spacing between the first lens group and the second lens group at the wide-angle end becomes too wide; there is no option but to increase the effective diameter of the first lens group, resulting in an increase its thickness. As the upper limit of 2.1 is exceeded, correction of aberrations at both the first lens group and the second lens group is increasingly difficult.

More preferably, $$1.5<-\beta_{2T}<2.0 \qquad (2)'$$

Most preferably, $$1.6 < -\beta_{2T} < 1.9 \quad (2)''$$

Referring here to a plurality of aspheric surfaces to be introduced on the object side of the second lens group, they should preferably be applied on both surfaces of the positive single lens element L21, because there is great merit in view of correction of spherical aberrations, relaxation of sensitivity to relative decenteration within the lens group. Both aspheric surfaces should preferably be displaced on the object side with respect to a spherical surface having an axial radius of curvature, because there is great merit in view of correction of spherical aberrations and relaxation of sensitivity to relative decentration within the lens group. Those aspheric surfaces should then preferably comply with the following condition (3).

$$1.0 \times 10^{-4} \cdot L < |Asp21R| < |Asp21F| < 4.0 \times 10^{-3} \cdot L \quad (3)$$

Here L is the diagonal length of an effective image pickup area (in a substantially rectangular form) of the electronic image pickup device, Asp21F is the amount of displacement, at a height of 0.3L from the optical axis, of the object side-aspheric surface of the single lens element L21 in the second lens group with respect to the spherical surface having an axial radius of curvature, and Asp21R is the amount of displacement, at a height of 0.3L from the optical axis, of the image side-aspheric surface of the single lens element L21 in the second lens group with respect to the spherical surface having an axial radius of curvature. Thus, the "amount of displacement of the aspheric surface" used herein refers to the amount of displacement, at the position of a height of 0.3L from the optical axis, of a certain aspheric surface with respect to a (reference) spherical surface having an axial radius of curvature (r), as shown in FIG. 7, wherein L is the diagonal length of the effective image pickup area of the image pickup device.

When the lower limit of $1.0 \times 10^{-4} \cdot L$ to condition (3) is not reached or when the middle signs of inequality are inversed, correction of spherical aberrations becomes insufficient. As the upper limit of $4.0 \times 10^{-3} \cdot L$ is exceeded, there is an increase in sensitivity to relative decentration of the aspheric surfaces to each component in the group.

More preferably, $$1.5 \times 10^{-4} \cdot L < |Asp21R| < |Asp21F| < 3.0 \times 10^{-3} \cdot L \quad (3)'$$

Most preferably, $$2.0 \times 10^{-4} \cdot L < |Asp21R < |Asp21F| < 2.0 \times 10^{-3} \cdot L \quad (3)''$$

Then, the shape of the doublet component in the second lens group should preferably comply with the following conditions (4) and (5).

$$0.6 < R_{23R}/R_{22F} < 1.0 \quad (4)$$

$$0 < L/R_{23F} < 1.2 \quad (5)$$

Here L is the diagonal length of the (substantially rectangular) effective image pickup area of the electronic image pickup device, $R_{22F}$ is the axial radius of curvature of the object side-surface of the positive lens element L22 in the second lens group, $R_{23R}$ is the axial radius of curvature of the image side-surface of the negative lens group L23 in the second lens group, and $R_{23F}$ is the axial radius of curvature of the cementing surface of the doublet component in the second lens group.

As the upper limit of 1.0 to condition (4) is exceeded, correction of spherical aberrations, coma and astigmatism within the group becomes insufficient and the effect of cementing on relaxation of sensitivity to decentration within the group becomes slender. As the lower limit of 0.6 is not reached, correction of spherical aberrations, coma and astigmatism may favorably be made with some effect on relaxation of sensitivity to decentration. However, size reductions are hardly achievable because the magnification of the second lens group must be increased.

Condition (5) defines the shape of the cementing surface. As the upper limit of 1.2 is exceeded, longitudinal chromatic aberration and chromatic aberration of magnification are susceptible to under-correction. Being short of the lower limit of 0 is not preferable because the axial thickness of the positive lens element in the doublet component increases due to the need of ensuring its edge thickness.

More preferably, the following conditions (4)' and/or (5)' should be satisfied.

$$0.65 < R_{23R}/R_{22F} < 0.95 \quad (4)'$$

$$0.2 < L/R_{23F} < 1.0 \quad (5)'$$

Most preferably, the following conditions (4)'' and/or (5)'' should be satisfied.

$$0.7 < R_{23R}/R_{22F} < 0.9 \quad (4)''$$

$$0.4 < L/R_{23F} < 0.8 \quad (5)''$$

If the first lens group is made up of only two lens elements or a negative element including an aspheric surface and a positive lens element while the following conditions (6) and (7) are satisfied, it is then possible to make satisfactory correction for chromatic aberrations and each Seidel off-axis aberration, resulting in some contributions to size reductions.

$$20 < \nu_{11} - \nu_{12} \quad (6)$$

$$-8 < (R_{13} + R_{14})/(R_{13} - R_{14}) < -1.5 \quad (7)$$

Here $\nu_{11}$ is the Abbe number on a d-line basis of the medium of the negative lens element in the first lens group, $\nu_{12}$ is the Abbe number on the d-line basis of the medium of the positive lens element in the first lens group, $R_{13}$ is the axial radius of curvature of the object side-surface of the positive lens element in the first lens group, and $R_{14}$ is the axial radius of curvature of the image side-surface of the positive lens element in the first lens group.

Condition (6) defines fluctuations of longitudinal chromatic aberration and chromatic aberration of magnification with zooming. As the lower limit of 20 is not reached, the fluctuations of longitudinal chromatic aberration and chromatic aberration of magnification tend to become large. Although there is no particular upper limit because of the absence of any more suitable medium, the highest possible upper limit value of $\nu_{11} - \nu_{12}$ is 75. Lens materials exceeding the upper limit value of 75 cost much.

Condition (7) defines the shape factor of the positive lens element in the first lens group. Being short of the lower limit of −8 is not only unfavorable for correction of astigmatism but is also disadvantageous in that the spacing between the first lens group and the second lens group must excessively be widened for avoidance of mechanical interferences during zooming. Exceeding the upper limit of −1.5 is unfavorable for correction of distortions.

More preferably, the following conditions (6)' and/or (7)' should be satisfied.

$$22 < \nu_{11} - \nu_{12} \quad (6)$$

$$-7 < (R_{13} + R_{14})/(R_{13} - R_{14}) < -2.0 \quad (7)$$

Even more preferably, the following conditions (6)" or (7)" should be satisfied.

$$24 < v_{11} - v_{12} \quad (6)"$$

$$-6 < (R_{13} + R_{14})/(R_{13} - R_{14}) < -2.5 \quad (7)"$$

Most preferably, both conditions (6)" and (7)" should be satisfied.

It is also preferable to comply with the following condition (8):

$$0.2 < d_{11}/L < 0.65 \quad (8)$$

Here L is the diagonal length of the effective image pickup area of the electronic image pickup device, and $d_{11}$ is the axial air separation between the negative lens element and the positive lens element in the first lens group.

Exceeding the upper limit of 0.65 to condition (8) may be favorable for correction of coma, astigmatism and distortion, but causes the optical system to become bulky. As the lower limit of 0.2 is not reached, correction of these aberrations becomes difficult irrespective of the introduction of aspheric surfaces and, at the same time, the sensitivity of the first lens group to relative decentration is likely to become high.

More preferably, $$0.25 < d_{11}/L < 0.6 \quad (8)'$$

Most preferably, $$0.3 < d_{11}/L < 0.55 \quad (8)"$$

It is here noted that if, upon zooming from the wide-angle end to the telephoto end, the third lens group is designed to move toward the image side in a convex locus, it is then easy to make allowance for regulation at the telephoto end where there is a large variation in focusing position due to quality errors. The third lens group may be composed of one positive lens element. Even so, it is possible to make practical-rank correction for aberrations, resulting is some contributions to thickness reductions.

To set up an electronic image pickup system, an image pickup device should preferably be located on the image plane side of the zoom lens of the invention, because off-axis chief rays emerge in a state substantially vertical to the image plane.

In order to make a sensible tradeoff between satisfactory image quality and size reductions, it is preferable that the diagonal length L of the effective image pickup area of the image pickup device is in the range of 3.0 mm to 12.0 mm.

When the lower limit of 3.0 mm is not reached or the image pickup device becomes too small, it is difficult to compensate for lack of sensitivity. As the upper limit of 12.0 mm is exceeded or the image pickup device becomes too large, the zoom lens can become unavoidably large, making the effect on thickness reductions slender.

The present invention is favorable for setting up an electronic image pickup system including a wide-angle area. In particular, the present invention is preferable for use on an electronic image pickup system wherein the diagonal half angle of view, $\omega_W$, at the wide-angle end complies with the following condition (this diagonal half angle of view is tantamount to the wide-angle-end half angle of view $\omega_W$ referred to in the examples given later):

$$27° < \omega_W < 42°$$

Being less than the lower limit of 27° to this condition or the wide-angle-end half angle of view becoming narrow is advantageous for correction of aberrations; however, this wide-angle-end half angle is no longer practical. As the upper limit of 42° is exceeded, on the other hand, distortion and chromatic aberration of magnification tend to occur and the number of lens elements increases.

Next, how and why the thickness of filters is reduced is now explained. In an electronic image pickup system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance ($\tau_{600}$) of at least 80% at 600 nm and a transmittance ($\tau_{700}$) of up to 8% at 700 nm is introduced between the image pickup device in the rear of the zoom lens system and the object side of the system, the transmittance at a near-infrared area of 700 nm or longer is relatively lower and the transmittance on the red side is relatively higher as compared with those of the absorption type, so that the tendency of bluish purple to turn into magenta—a defect of a CCD or other solid-state image pickup device having a complementary colors mosaic filter—is diminished by gain control and there can be obtained color reproduction comparable to that by a CCD or other solid-state image pickup device having a primary colors filter.

Thus, it is preferable to comply with the following conditions (9) and (10):

$$\tau_{600}/\tau_{550} \geq 0.8 \quad (9)$$

$$\tau_{700}/\tau_{550} \leq 0.08 \quad (10)$$

Here $\tau_{550}$ is the transmittance at a wavelength of 550 nm.

More preferably, the following conditions (9)' and/or (10)' should be met:

$$\tau_{600}/\tau_{550} \geq 0.85 \quad (9)'$$

$$\tau_{700}/\tau_{550} \leq 0.05 \quad (10)'$$

Even more preferably, the following conditions (9)" or (10)" should be met:

$$\tau_{600}/\tau_{550} \geq 0.9 \quad (9)"$$

$$\tau_{700}/\tau_{550} \leq 0.03 \quad (10)"$$

Most preferably, both the following conditions (9)" and (10)" should be met:

$$\tau_{600}/\tau_{550} \geq 0.9 \quad (9)"$$

$$\tau_{700}/\tau_{550} \leq 0.03 \quad (10)"$$

Another defect of the CCD or other solid-state image pickup device is that the sensitivity to the wavelength of 550 nm in the near ultraviolet area is considerably higher than that of the human eye. This, too, makes noticeable colors running at the edges of an image due to chromatic aberrations in the near ultraviolet area. Such color running is fatal to a compact optical system. Accordingly, if an absorber or reflector is inserted on the optical path, which is designed such that the ratio of the transmittance ($\tau_{400}$) at 400 nm wavelength to that ($\tau$550) at 550 nm wavelength is less than 0.08 and the ratio of the transmittance ($\tau_{440}$) at 440 nm wavelength to that ($\tau$550) at 550 nm wavelength is greater than 0.4, it is then possible to considerably reduce noises such as color running while the wavelength area necessary for color reproduction (satisfactory color reproduction) is kept intact.

It is thus preferably to comply with the following conditions (11) and (12):

$$\tau_{400}/\tau_{500} \geq 0.08 \quad (11)$$

$$\tau_{440}/\tau_{550} \leq 0.4 \quad (12)$$

More preferably, the following conditions (11)' and/or (12)' should be satisfied.

$$\tau_{400}/\tau_{550} \geq 0.06 \quad (11)'$$

$$\tau_{440}/\tau_{550} \leq 0.5 \quad (12)'$$

Even more preferably, the following condition (11)'' or (12)'' should be satisfied.

$$\tau_{400}/\tau_{550} \leq 0.04 \quad (11)''$$

$$\tau_{440}/\tau_{550} \geq 0.6 \quad (12)''$$

Most preferably, both the following condition (11)'' and (12)'' should be satisfied.

$$\tau_{400}/\tau_{550} \geq 0.004 \quad (11)''$$

$$\tau_{440}/\tau_{550} \leq 0.6 \quad (12)''$$

It is noted that these filters should preferably be located between the image-formation optical system and the image pickup device.

On the other hand, a complementary filter is higher in substantial sensitivity and more favorable in resolution than a primary colors filter-inserted CCD due to its high transmitted light energy, and provides a great merit when used in combination with a small-size CCD. Regarding an optical low-pass filter that is another filter, too, its total thickness, $t_{LPF}$, should preferably comply with the following condition (13):

$$0.15 < t_{LPF}/a < 0.45 \; (mm) \quad (13)$$

Here a is the horizontal pixel pitch (in $\mu$m) of the image pickup device.

Reducing the thickness of the optical low-pass filter, too, is effective for making the thickness of the zoom lens upon received in a collapsible mount; however, this is generally not preferred because the moiré preventive effect becomes slender. On the other hand, as the pixel pitch becomes small, the contrast of frequency components greater than Nyquist threshold decreases under the influence of diffraction of an image-formation lens system and, consequently, the decrease in the moiré preventive effect is more or less acceptable. For instance, it is known that when three different filters having crystallographic axes in directions where upon projected onto the image plane, the azimuth angle is horizontal (=0°) and ±45° are used while they are put one upon another, some moiré preventive effect is obtainable. According to the specifications known to make the filter assembly thinnest, each filter is displaced by a $\mu$m in the horizontal and by SQRT(1/2)*a $\mu$m in the ±45° directions. Here SQRT means a square root. The then filter thickness is approximately given by [1+2*SQRT(1/2)]*a/5.88 (mm). This is the specification where the contrast is reduced down to zero at a frequency corresponding just to Nyquist threshold. At a thickness a few % to a few tens of % smaller than this, a little more contrast of the frequency corresponding to Nyquist threshold appears; however, this can be suppressed under the influence of the aforesaid diffraction.

In other filter embodiments where two filters are placed one upon another or one single filter is used, too, it is preferable to comply with condition (13). When the upper limit of 0.45 is exceeded, the optical low-pass filter becomes too thick, contrary to size reduction requirements. When the lower limit of 0.15 is not reached, moiré removal becomes insufficient. In this condition, a should be 5 $\mu$m or less.

When a is 4 $\mu$m or less or where the optical low-pass filter is more susceptible to diffraction, it is preferable that $$0.13 < t_{LPF}/a < 0.42 \; (mm) \quad (13)'$$

Depending on the number of low-pass filters put on the horizontal pixel pitch, it is also acceptable to comply with the following condition (13)'':

$$0.3 < t_{LPF}/a < 0.4 \; (mm) \quad (13)''$$

However, 0.2<$t_{LPF}$/a<0.28 (mm) provided that three filters are placed one upon another and 4≦a<5 $\mu$m, 0.1<$t_{LPF}$/a<0.16 (mm) provided that two filters are placed one upon another and 4≦a<5 $\mu$m, 0.1<$t_{LPF}$/a<0.16 (mm) provided that one filter is used and 4≦a<5 $\mu$m, 0.25<$t_{LPF}$/a<0.37 (mm) provided that three filters are placed one upon another and a<4 $\mu$m, 0.16<$t_{LPF}$/a<0.25 (mm) provided that two filters are placed one upon another and a<4 $\mu$m, and 0.08<$t_{LPF}$/a<0.14 (mm) provided that one filter is used and a<4 $\mu$m.

When an image pickup device having a small pixel pitch is used, there is degradation in image quality under the influence of diffraction effect by stop-down. In this case, the electronic image pickup system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by a ($\mu$m)/F-number<4.0, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

Figure 1A:
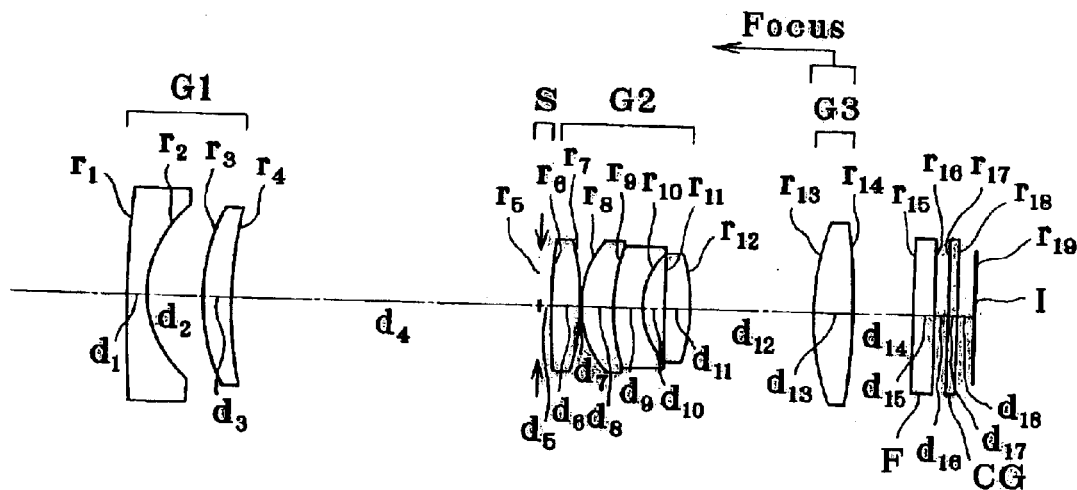
FIGS. 1(a), 1(b) and 1(c) are sections in schematic illustrative of Example 1 of the zoom lens used with the electronic image pickup system of the invention at the wide-angle end when the zoom lens is focused on an object point at infinity.
Figure 1B:
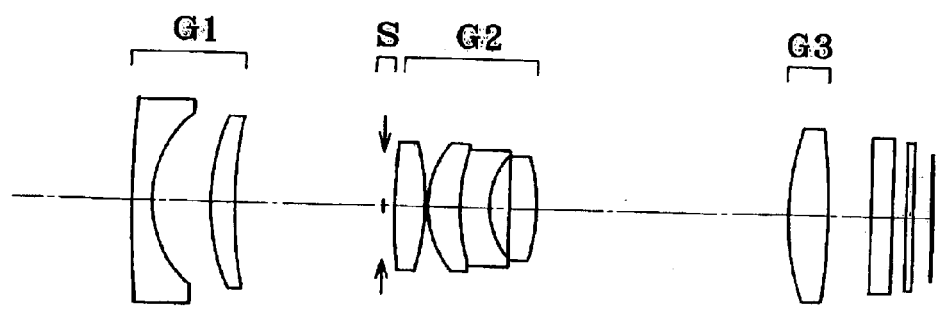
Figure 1C:
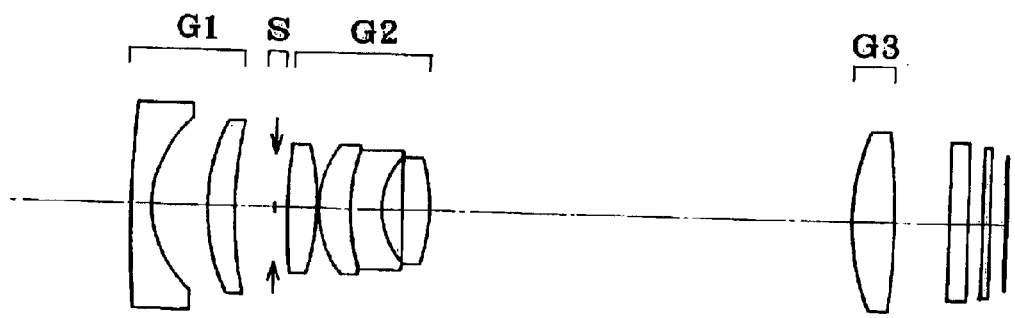
Figure 2A:
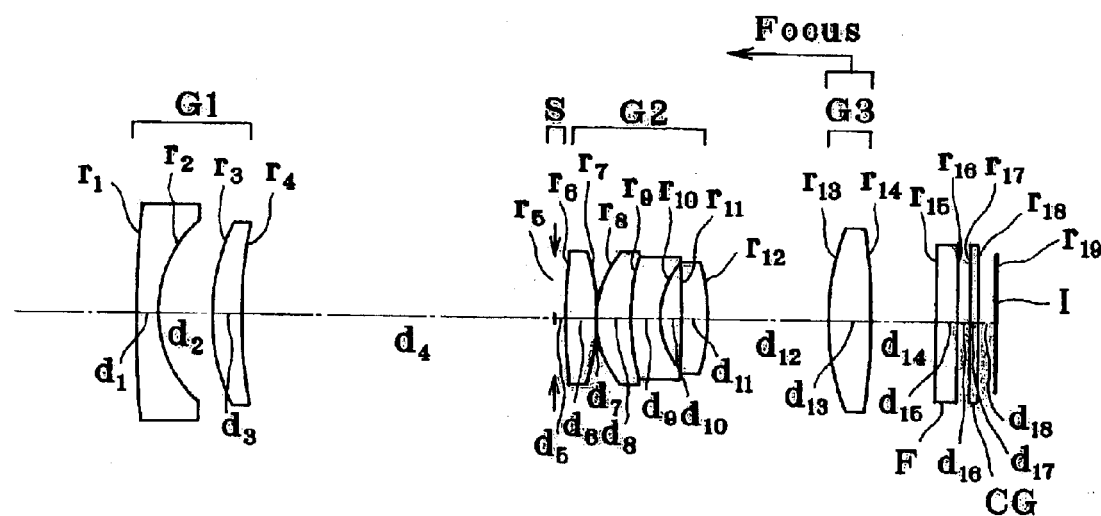
FIGS. 2(a), 2(b) and 2(c) are sections in schematic illustrative of Example 2 of the zoom lens, similar to FIGS. 1(a) to 1(c).
Figure 2B:
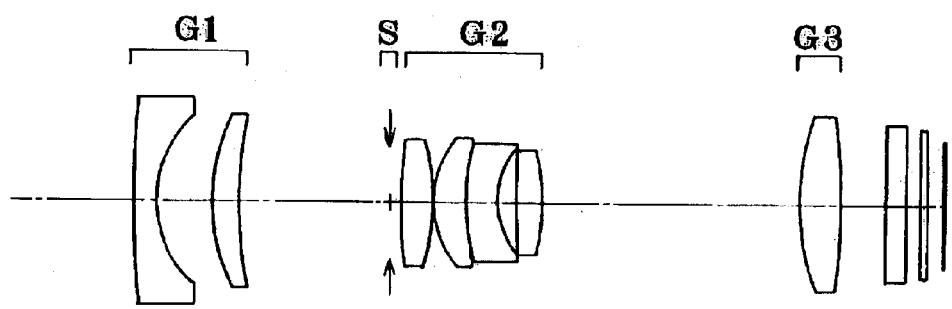
Figure 2C:
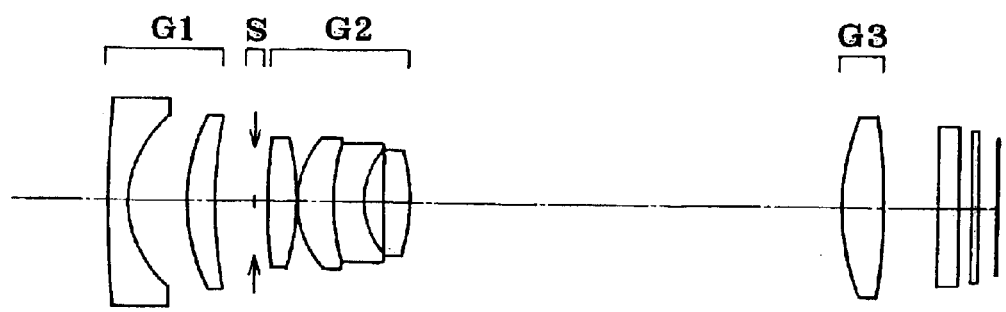
Figure 3A:
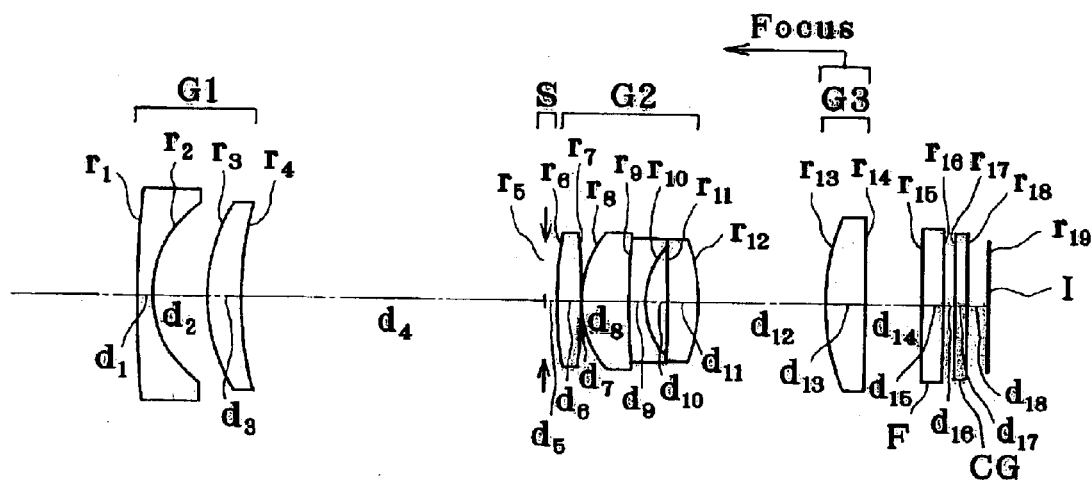
FIGS. 3(a), 3(b) and 3(c) are sections in schematic illustrative of Example 3 of the zoom lens, similar to FIGS. 1(a) to 1(c).
Figure 3B:
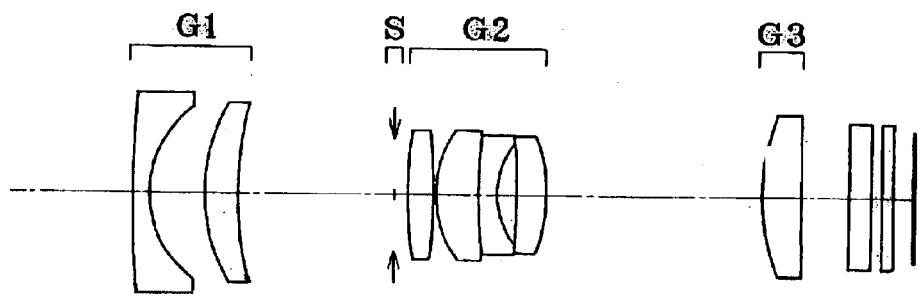
Figure 3C:
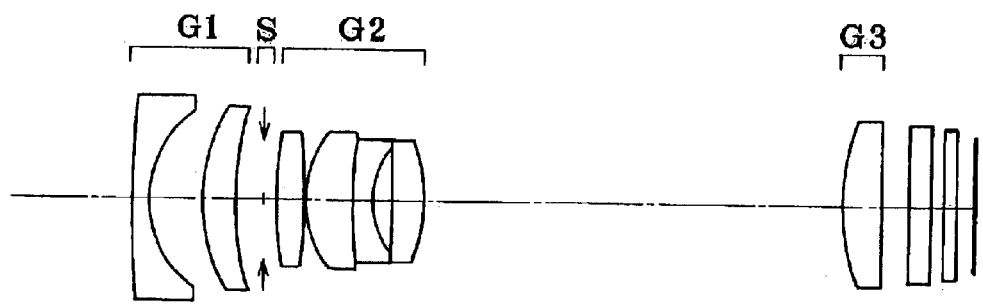

Examples 1 to 3 of the zoom lens used with the electronic image pickup system of the invention are now explained. Sectional lens configurations of these examples at the wide-angle end (a), in an intermediate state (b) and at the telephoto end (c) upon focused on an object point at infinity are shown in FIGS. 1 through 3 wherein G1 represents a first lens group, G2 a second lens group, G3 a third lens group, capital F a combination of an infrared cut absorption filter with a low-pass filter, CG a cover glass for a CCD that is an electronic image pickup device, and I the image plane of CCD. Instead of the infrared cut absorption filter, it is acceptable to use a transparent plane plate with a near-infrared sharp cut coat applied on the entrance surface or a low-pass filter LF that is directly provided with a near-infrared sharp cut coat.

EXAMPLE 1

As shown in FIG. 1, Example 1 is directed to a zoom lens made up of a first lens group G1 composed of a negative meniscus lens element convex on its object side and a positive meniscus lens element on convex on its object side and having negative refracting power, an aperture stop S, a second lens group G2 having positive refracting power and composed of a double-convex positive lens element, a doublet having positive refracting power and consisting of a positive meniscus lens element convex on its object side and a negative meniscus lens element convex on its object side and a double-convex positive lens element, and a third lens group G3 composed of one double-convex positive lens and having positive refracting power. Upon zooming from the wide-angle end to the telephoto end of the zoom lens, the first lens group G1 moves toward the object side of the zoom lens in a concave locus and is positioned nearer to the object side at the telephoto end than at the wide-angle end, the second lens group G2 moves together with the aperture stop S toward the object side, and the third lens group G3 moves toward the image plane side of the zoom lens in a convex locus and is positioned nearer to the image plane side at the telephoto end than at the wide-angle end. For focusing on a nearby subject, the third lens group G3 is moved toward the object side.

Three aspheric surfaces are used, one at the image plane side-surface of the negative meniscus lens element in the first lens group G1 and two at both surfaces of the double-convex positive lens element located on the object side of the second lens group G2.

EXAMPLE 2

As shown in FIG. 2, Example 2 is directed to a zoom lens made up of a first lens group G1 composed of a negative meniscus lens element convex on its object side and a positive meniscus lens element convex on its object side and having negative refracting power, an aperture stop S, a second lens group G2 having positive refracting power and composed of a double-convex positive lens element, a doublet having positive refracting power and consisting of a positive meniscus lens element convex on its object side and a negative meniscus lens element convex on its object side and a double-convex positive lens element, and a third lens group G3 composed of one double-convex positive lens element and having positive refracting power. Upon zooming from the wide-angle end to the telephoto end of the zoom lens, the first lens group G1 moves toward the object side in a concave locus and is positioned nearer to the object side at the telephoto end than at the wide-angle end, the second lens group G2 moves together with the aperture stop S toward the object side, and the third lens group G3 moves toward the image plane side of the zoom lens in a convex locus and is positioned nearer to the image plane side at the telephoto end than at the wide-angle end. For focusing on a nearby subject, the third lens group G3 is moved toward the object side.

Three aspheric surfaces are used; one at the image plane side-surface of the negative meniscus lens element in the first lens group G1 and two at both surfaces of the double-convex positive lens element located on the object side of the second lens group G2.

EXAMPLE 3

As shown in FIG. 3, this example is directed to a zoom lens made up of a first lens group G1 composed of a negative meniscus lens element convex on its object side and a positive meniscus lens element convex on its object side and having refracting power, an aperture stop S, a second lens group G2 having positive refracting power and composed of a double-convex positive lens element, a doublet consisting of a positive meniscus lens element convex on its object side and a negative meniscus lens element convex on its object side and a positive meniscus lens element convex on its image plane side, and a third lens group G3 composed of one positive meniscus lens element convex on its object side and having positive refracting power. Upon zooming from the wide-angle end to the telephoto end of the zoom lens, the first lens group G1 moves toward the object side in a concave locus and is positioned slightly nearer to the image plane side of the zoom lens at the telephoto end than at the wide-angle end, the second lens group G2 moves together with the aperture stop S toward the object side, and the third lens group G3 moves toward the image plane side. For focusing on a nearby subject, the third lens group G3 is moved toward the object side.

Three aspheric surfaces are used; one at the image plane side-surface of the negative meniscus lens element in the first lens group G1, one at the object side-surface of the double-convex positive lens element located on the object side of the second lens group G2, and one at the object side-surface of the doublet.

Set out below are the numerical data on each example. Symbols used hereinafter but not hereinbefore have the following meanings:

f: focal length of the zoom lens
$F_{NO}$: F-number
ω: half angle of view
WE: wide-angle end
ST: standard or intermediate state
TE: telephoto end
$r_1, r_2, \ldots$: radius of curvature of each lens element
$d_1, d_2, \ldots$: spacing between the adjacent lens elements
$n_{d1}, n_{d2}, \ldots$: d-line refractive index of each lens element
$\nu_{d1}, \nu_{d2}, \ldots$: Abbe number of each lens element Here let x be an optical axis on condition that the direction of propagation of light is positive and y be a direction perpendicular to the optical axis. Then, aspheric configuration is given by $$x = (y^2/r)/[1+\{1-(K+1)(y/r)^2\}^{1/2}] + A_4 y^4 + A_6 y^6 + A_8 y^8 + A_{10} y^{10}$$

where r is a paraxial radius of curvature, K is a conical coefficient, and $A_4$, $A_6$, $A_8$ and $A_{10}$ are the fourth, sixth, eighth and tenth aspheric coefficients, respectively.

EXAMPLE 1

| | | | | | | | | |
|---|---|---|---|---|---|---|---|---|
| $r_1 =$ | 99.854 | $d_1 =$ | 1.15 | $n_{d1} =$ | 1.74330 | $\nu_{d1} =$ | 49.33 |
| $r_2 =$ | 6.909 (Aspheric) | $d_2 =$ | 3.50 | | | | |
| $r_3 =$ | 13.258 | $d_3 =$ | 1.72 | $n_{d2} =$ | 1.84666 | $\nu_{d2} =$ | 23.78 |
| $r_4 =$ | 26.361 | $d_4 =$ | (Variable) | | | | |
| $r_5 =$ | ∞ (Stop) | $d_5 =$ | 0.80 | | | | |
| $r_6 =$ | 42.151 (Aspheric) | $d_6 =$ | 1.70 | $n_{d3} =$ | 1.58313 | $\nu_{d3} =$ | 59.46 |
| $r_7 =$ | −24.610 (Aspheric) | $d_7 =$ | 0.10 | | | | |
| $r_8 =$ | 6.884 | $d_8 =$ | 2.08 | $n_{d4} =$ | 1.69350 | $\nu_{d4} =$ | 53.20 |
| $r_9 =$ | 14.727 | $d_9 =$ | 1.93 | $n_{d5} =$ | 1.84666 | $\nu_{d5} =$ | 23.78 |
| $r_{10} =$ | 5.571 | $d_{10} =$ | 1.31 | | | | |
| $r_{11} =$ | 172.624 | $d_{11} =$ | 1.50 | $n_{d6} =$ | 1.48749 | $\nu_{d6} =$ | 70.23 |
| $r_{12} =$ | −16.216 | $d_{12} =$ | (Variable) | | | | |
| $r_{13} =$ | 18.049 | $d_{13} =$ | 2.29 | $n_{d7} =$ | 1.48749 | $\nu_{d7} =$ | 70.23 |
| $r_{14} =$ | −94.258 | $d_{14} =$ | (Variable) | | | | |
| $r_{15} =$ | ∞ | $d_{15} =$ | 1.30 | $n_{d8} =$ | 1.54771 | $\nu_{d8} =$ | 62.84 |
| $r_{16} =$ | ∞ | $d_{16} =$ | 0.80 | | | | |
| $r_{17} =$ | ∞ | $d_{17} =$ | 0.50 | $n_{d9} =$ | 1.51633 | $\nu_{d9} =$ | 64.14 |
| $r_{18} =$ | ∞ | $d_{18} =$ | 1.00 | | | | |
| $r_{19} =$ | ∞ (Image Plane) | | | | | | |

Aspherical Coefficients
2nd surface

K = −0.254
$A_4$ = −1.57068 × 10$^{-4}$
$A_6$ = −7.03663 × 10$^{-7}$
$A_8$ = −6.21608 × 10$^{-8}$
$A_{10}$ = 8.63731 × 10$^{-11}$

6th surface

K = −14.647
$A_4$ = −2.81562 × 10$^{-4}$
$A_6$ = 2.53496 × 10$^{-6}$
$A_8$ = 0
$A_{10}$ = 0

7th surface

K = −0.457
$A_4$ = −2.18416 × 10$^{-4}$
$A_6$ = 3.45777 × 10$^{-6}$
$A_8$ = 0
$A_{10}$ = 0

| Zooming Data (∞) | WE | ST | TE |
|---|---|---|---|
| f (mm) | 7.955 | 13.590 | 22.810 |
| $F_{NO}$ | 2.77 | 3.64 | 4.90 |
| ω (°) | 29.17 | 18.09 | 11.01 |
| $d_4$ | 19.30 | 9.23 | 2.60 |
| $d_{12}$ | 7.58 | 15.72 | 26.44 |
| $d_{14}$ | 3.94 | 2.87 | 3.37 |

EXAMPLE 2

| | | | | | | | | |
|---|---|---|---|---|---|---|---|---|
| $r_1 =$ | 102.168 | $d_1 =$ | 1.15 | $n_{d1} =$ | 1.74330 | $\nu_{d1} =$ | 49.33 |
| $r_2 =$ | 6.930 (Aspheric) | $d_2 =$ | 3.52 | | | | |
| $r_3 =$ | 13.253 | $d_3 =$ | 1.72 | $n_{d2} =$ | 1.84666 | $\nu_{d2} =$ | 23.78 |
| $r_4 =$ | 26.361 | $d_4 =$ | (Variable) | | | | |
| $r_5 =$ | ∞ (Stop) | $d_5 =$ | 0.80 | | | | |
| $r_6 =$ | 31.810 (Aspheric) | $d_6 =$ | 1.70 | $n_{d3} =$ | 1.58313 | $\nu_{d3} =$ | 59.46 |
| $r_7 =$ | −29.050 (Aspheric) | $d_7 =$ | 0.10 | | | | |
| $r_8 =$ | 6.999 | $d_8 =$ | 2.08 | $n_{d4} =$ | 1.69350 | $\nu_{d4} =$ | 53.20 |
| $r_9 =$ | 14.639 | $d_9 =$ | 1.92 | $n_{d5} =$ | 1.84666 | $\nu_{d5} =$ | 23.78 |
| $r_{10} =$ | 5.564 | $d_{10} =$ | 1.29 | | | | |
| $r_{11} =$ | 103.001 | $d_{11} =$ | 1.49 | $n_{d6} =$ | 1.48749 | $\nu_{d6} =$ | 70.23 |
| $r_{12} =$ | −16.422 | $d_{12} =$ | (Variable) | | | | |
| $r_{13} =$ | 19.178 | $d_{13} =$ | 2.31 | $n_{d7} =$ | 1.48749 | $\nu_{d7} =$ | 70.23 |
| $r_{14} =$ | −65.336 | $d_{14} =$ | (Variable) | | | | |
| $r_{15} =$ | ∞ | $d_{15} =$ | 1.30 | $n_{d8} =$ | 1.54771 | $\nu_{d8} =$ | 62.84 |
| $r_{16} =$ | ∞ | $d_{16} =$ | 0.80 | | | | |
| $r_{17} =$ | ∞ | $d_{17} =$ | 0.50 | $n_{d9} =$ | 1.51633 | $\nu_{d9} =$ | 64.14 |
| $r_{18} =$ | ∞ | $d_{18} =$ | 1.00 | | | | |
| $r_{19} =$ | ∞ (Image Plane) | | | | | | |

-continued

Aspherical Coefficients
2nd surface

| | | |
|---|---|---|
| K | = | −0.210 |
| $A_4$ | = | $-1.68450 \times 10^{-4}$ |
| $A_6$ | = | $-2.05627 \times 10^{-6}$ |
| $A_8$ | = | $-1.46955 \times 10^{-8}$ |
| $A_{10}$ | = | $-7.83704 \times 10^{-10}$ |

6th surface

| | | |
|---|---|---|
| K | = | −14.968 |
| $A_4$ | = | $-2.29056 \times 10^{-4}$ |
| $A_6$ | = | $-5.64948 \times 10^{-6}$ |
| $A_8$ | = | 0 |
| $A_{10}$ | = | 0 |

7th surface

| | | |
|---|---|---|
| K | = | −0.093 |
| $A_4$ | = | $-2.10470 \times 10^{-4}$ |
| $A_6$ | = | $-4.02856 \times 10^{-6}$ |
| $A_8$ | = | 0 |
| $A_{10}$ | = | 0 |

| Zooming Data (∞) | WE | ST | TE |
|---|---|---|---|
| f (mm) | 7.955 | 13.591 | 22.808 |
| $F_{NO}$ | 2.77 | 3.63 | 4.90 |
| ω (°) | 29.17 | 18.09 | 11.02 |
| $d_4$ | 19.33 | 9.25 | 2.60 |
| $d_{12}$ | 7.59 | 15.76 | 26.52 |
| $d_{14}$ | 3.95 | 2.88 | 3.37 |

EXAMPLE 3

| | | | | | | | |
|---|---|---|---|---|---|---|---|
| $r_1$ = | 88.150 | $d_1$ = | 1.00 | $n_{d1}$ = | 1.74320 | $v_{d1}$ = | 49.34 |
| $r_2$ = | 6.699 (Aspheric) | $d_2$ = | 3.40 | | | | |
| $r_3$ = | 12.899 | $d_3$ = | 2.00 | $n_{d2}$ = | 1.84666 | $v_{d2}$ = | 23.78 |
| $r_4$ = | 26.361 | $d_4$ = | (Variable) | | | | |
| $r_5$ = | ∞ (Stop) | $d_5$ = | 0.80 | | | | |
| $r_6$ = | 28.208 (Aspheric) | $d_6$ = | 1.60 | $n_{d3}$ = | 1.60311 | $v_{d3}$ = | 60.64 |
| $r_7$ = | −48.622 | $d_7$ = | 0.10 | | | | |
| $r_8$ = | 7.673 (Aspheric) | $d_8$ = | 2.80 | $n_{d4}$ = | 1.69680 | $v_{d4}$ = | 55.53 |
| $r_9$ = | 36.338 | $d_9$ = | 1.24 | $n_{d5}$ = | 1.74077 | $v_{d5}$ = | 27.79 |
| $r_{10}$ = | 6.204 | $d_{10}$ = | 1.25 | | | | |
| $r_{11}$ = | −272.994 | $d_{11}$ = | 1.95 | $n_{d6}$ = | 1.49700 | $v_{d6}$ = | 81.54 |
| $r_{12}$ = | −12.449 | $d_{12}$ = | (Variable) | | | | |
| $r_{13}$ = | 17.529 | $d_{13}$ = | 2.30 | $n_{d7}$ = | 1.48749 | $v_{d7}$ = | 70.23 |
| $r_{14}$ = | 181.450 | $d_{14}$ = | (Variable) | | | | |
| $r_{15}$ = | ∞ | $d_{15}$ = | 1.30 | $n_{d8}$ = | 1.54771 | $v_{d8}$ = | 62.84 |
| $r_{16}$ = | ∞ | $d_{16}$ = | 0.80 | | | | |
| $r_{17}$ = | ∞ | $d_{17}$ = | 0.75 | $n_{d9}$ = | 1.51633 | $v_{d9}$ = | 64.14 |
| $r_{18}$ = | ∞ | $d_{18}$ = | 1.15 | | | | |
| $r_{19}$ = | ∞ (Image Plane) | | | | | | |

Aspherical Coefficients
2nd surface

| | | |
|---|---|---|
| K | = | −0.230 |
| $A_4$ | = | $-1.71927 \times 10^{-4}$ |
| $A_6$ | = | $-2.72780 \times 10^{-6}$ |
| $A_8$ | = | $-1.71350 \times 10^{-9}$ |
| $A_{10}$ | = | $-1.10011 \times 10^{-9}$ |

6th surface

| | | |
|---|---|---|
| K | = | −15.372 |
| $A_4$ | = | $-2.98788 \times 10^{-5}$ |
| $A_6$ | = | 0 |
| $A_8$ | = | 0 |
| $A_{10}$ | = | 0 |

-continued

8th surface

| | | |
|---|---|---|
| K | = | −0.202 |
| $A_4$ | = | $7.58950 \times 10^{-5}$ |
| $A_6$ | = | 0 |
| $A_8$ | = | 0 |
| $A_{10}$ | = | 0 |

| Zooming Data (∞) | WE | ST | TE |
|---|---|---|---|
| f (mm) | 7.920 | 12.180 | 22.795 |
| $F_{NO}$ | 2.60 | 3.14 | 4.50 |
| ω (°) | 29.17 | 19.95 | 10.97 |
| $d_4$ | 18.98 | 9.75 | 1.70 |
| $d_{12}$ | 7.72 | 13.27 | 26.19 |
| $d_{14}$ | 3.51 | 2.98 | 1.80 |

Figure 4A:
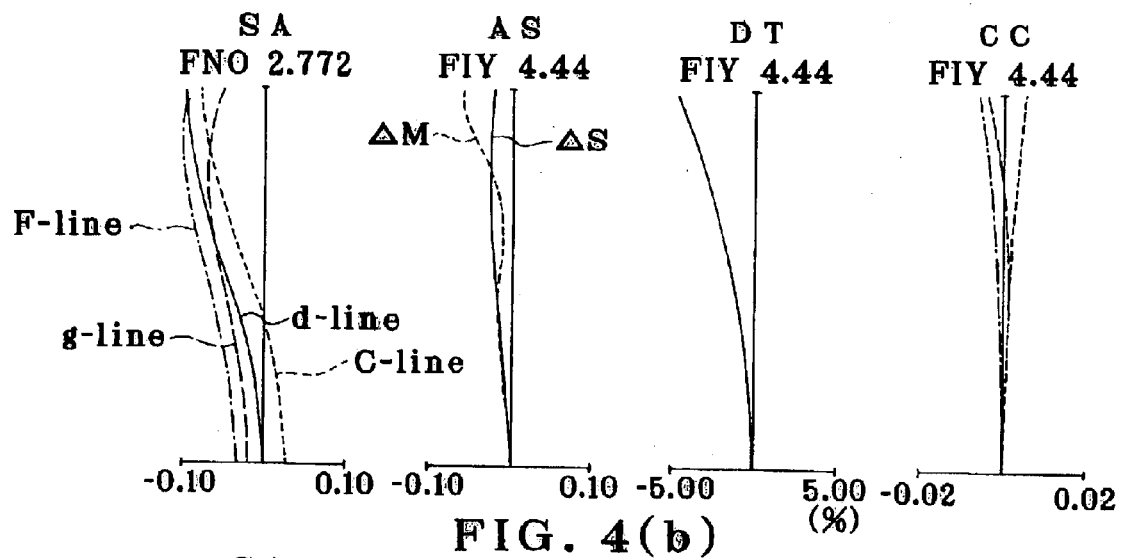
FIGS. 4(a), 4(b) and 4(c) are aberration diagrams of Example 1 upon focused on an object point at infinity.
Figure 4B:
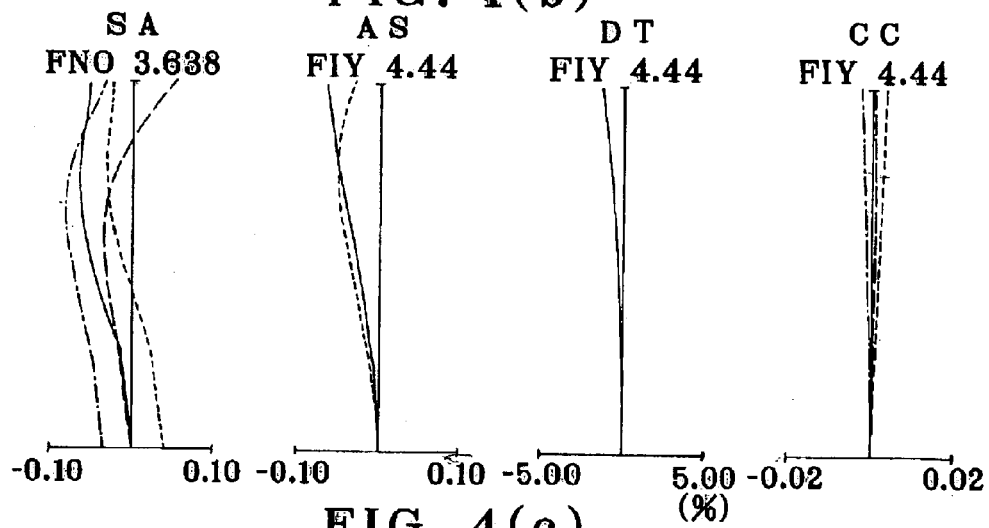
Figure 4C:
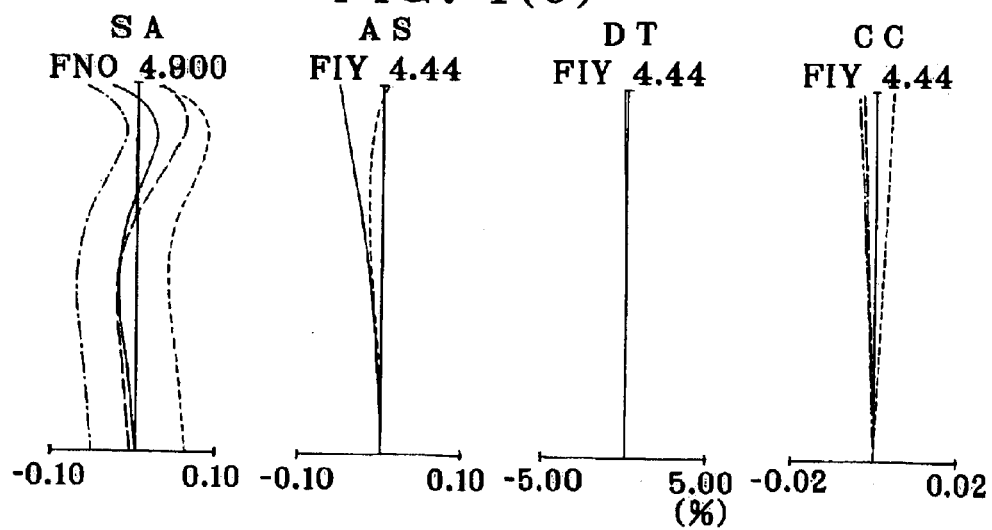
Figure 5A:
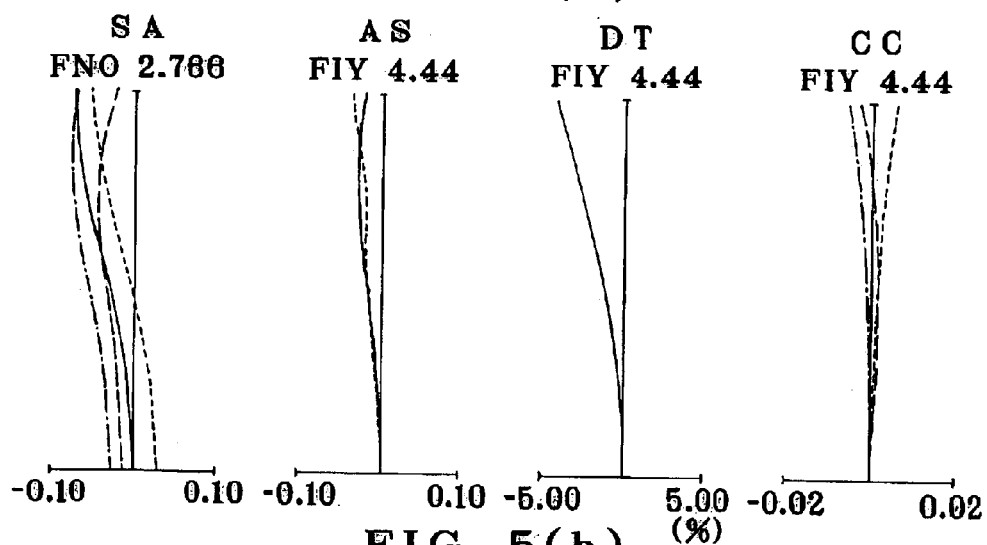
FIGS. 5(a), 5(b) and 5(c) are aberration diagrams of Example 2 upon focused on an object point at infinity.
Figure 5B:
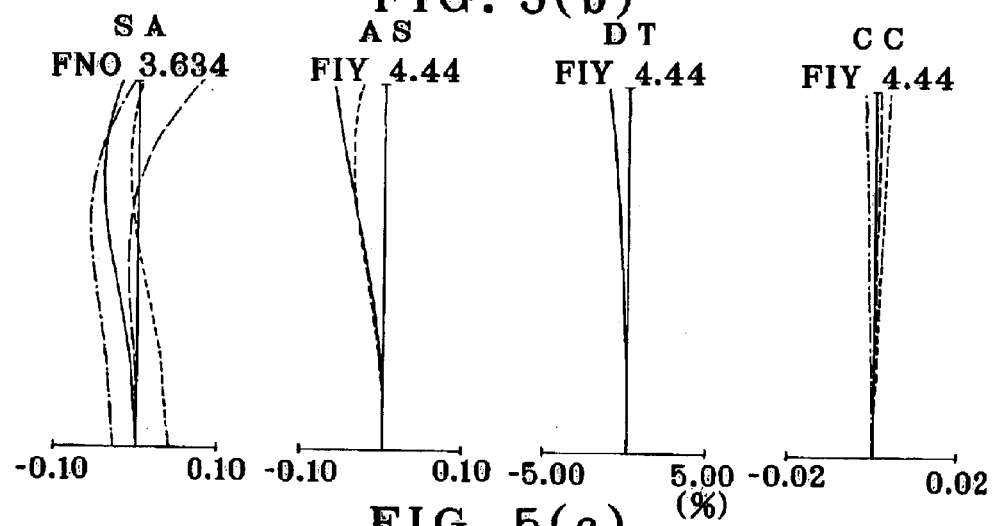
Figure 5C:
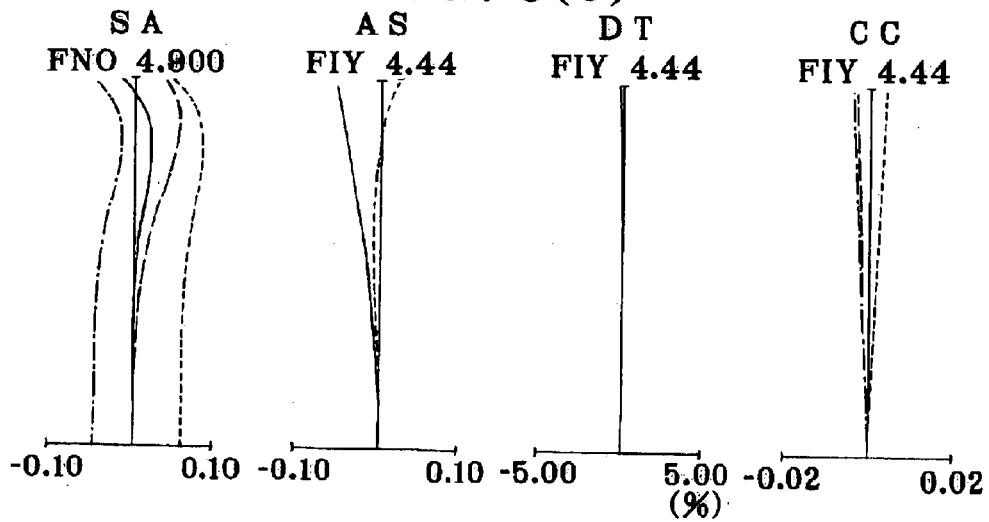
Figure 6A:
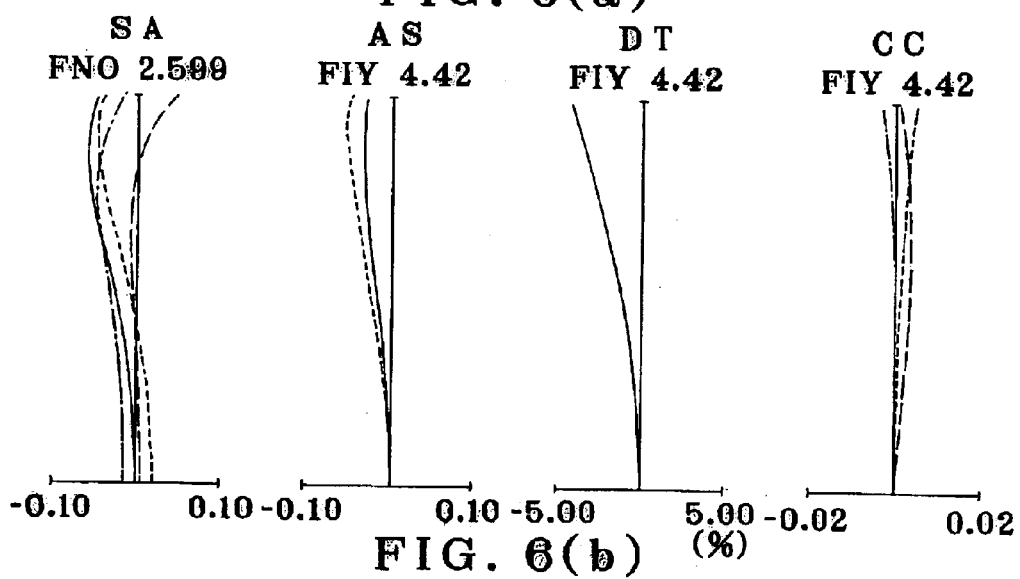
FIGS. 6(a), 6(b) and 6(c) are aberration diagrams of Example 3 upon focused on an object point at infinity.
Figure 6B:
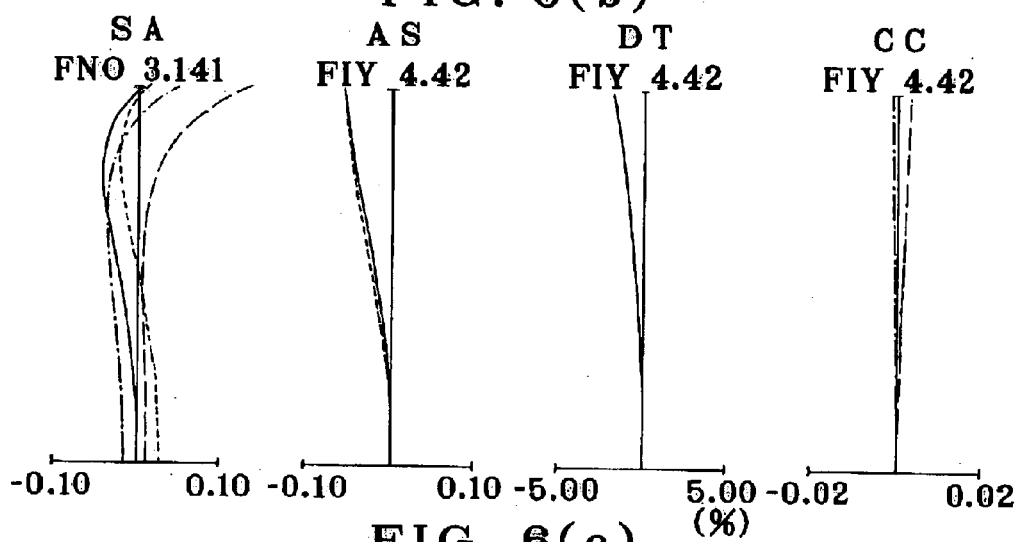
Figure 6C:
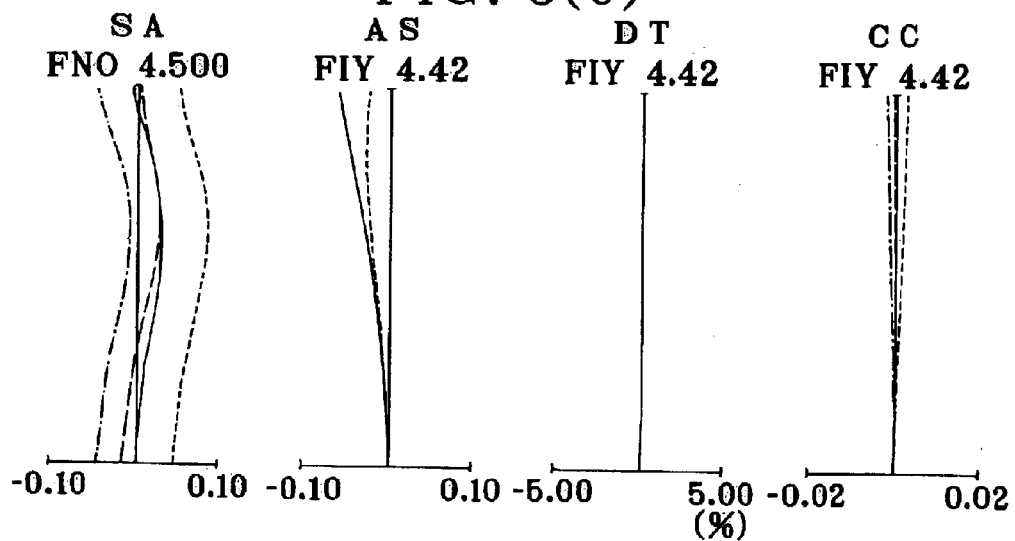
Figure 7:
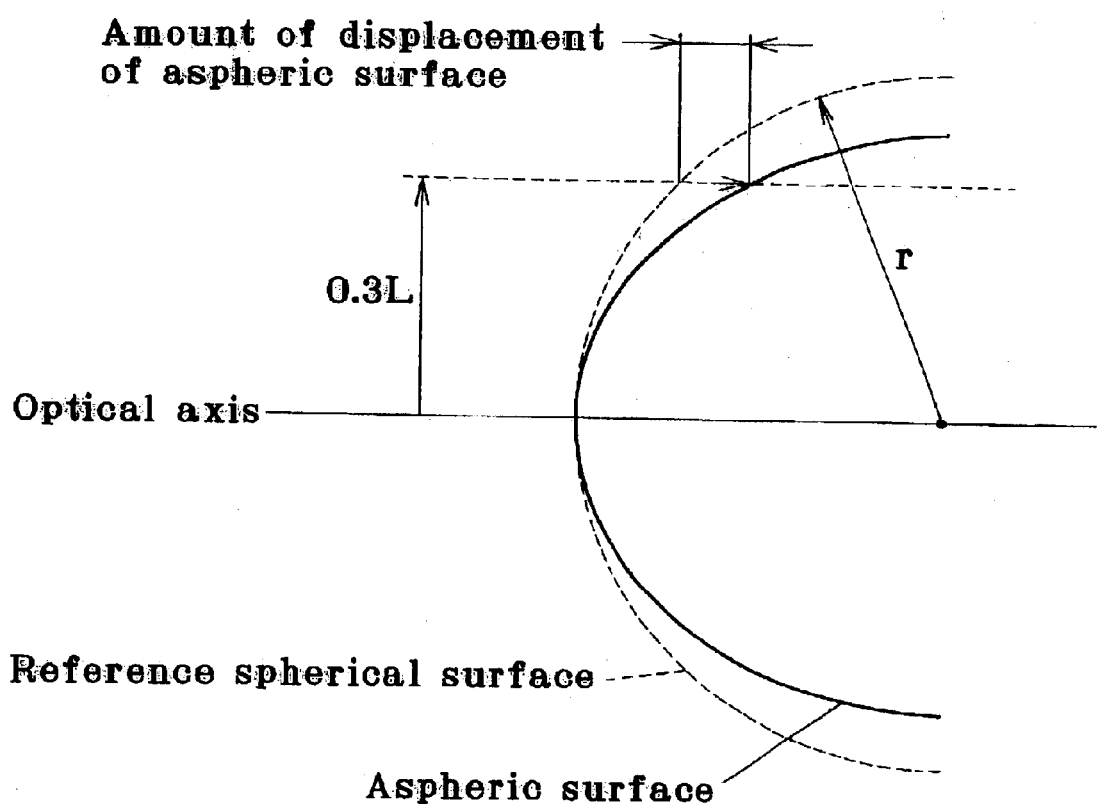
FIG. 7 is illustrative of the definition of the amount of displacement of an aspheric surface according to the invention.

FIGS. 4, 5 and 6 are aberration diagrams of Examples 1, 2 and 3 upon focused on an object point at infinity. In these figures, (a), (b) and (c) show spherical aberrations SA, astigmatism AS, distortion DT and chromatic aberration of magnification CC at the wide-angle end, in an intermediate state and at the telephoto end, respectively. "FIY" stands for an image height.

Tabulated below are the values of conditions (1), (2) and (4)–(13) as well as the values of Asp21F, Asp21R and L with respect to condition (3).

| Example | 1 | 2 | 3 |
|---|---|---|---|
| (1) | 0.26 | 0.05 | −0.27 |
| (2) | 1.73 | 1.73 | 1.58 |
| (4) | 0.81 | 0.79 | 0.81 |
| (5) | 0.60 | 0.61 | 0.24 |
| (6) | 25.55 | 25.55 | 25.56 |
| (7) | −3.02 | −3.02 | −2.92 |
| (8) | 0.39 | 0.40 | 0.38 |
| (9) | 1.0 | 1.0 | 1.0 |
| (10) | 0.04 | 0.04 | 0.04 |
| (11) | 0.0 | 0.0 | 0.0 |
| (12) | 1.06 | 1.06 | 1.06 |
| (13) | 0.333 | 0.333 | 0.333 |
| | (a = 3.0) | (a = 3.0) | (a = 3.0) |
| Asp21F | 0.014 | −0.016 | — |
| Asp21R | −0.009 | −0.012 | — |
| L | 8.88 | 8.88 | 8.84 |

It is noted that in Examples 1 to 3, the low-pass filter has a total thickness of 1.000 mm and a triple-layer structure. It is also appreciated that many modifications may be made to the aforesaid examples without departing from the scope of the invention. For instance, the low-pass filter may be formed of one single low-pass filter element.

Figure 8:
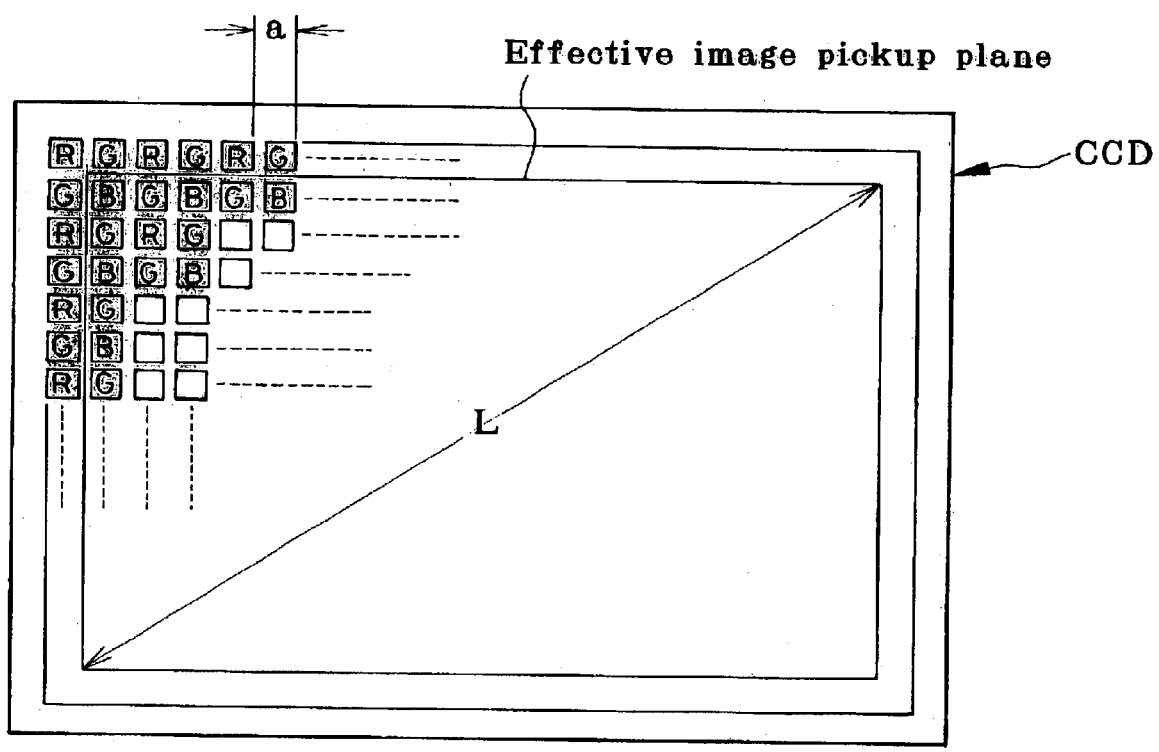
FIG. 8 is illustrative of the diagonal length of the effective image pickup plane of an electronic image pickup device upon phototaking.

Here the diagonal length L of the effective image pickup plane and the pixel spacing a are explained. FIG. 8 is illustrative of one exemplary pixel array of an image pickup device, wherein R (red), G (green) and B (blue) pixels or cyan, magenta, yellow and green (G) pixels are mosaically arranged at the pixel spacing a. The "effective image pickup plane" used herein is understood to mean a certain area in the photoelectric conversion surface on an image pickup device used for the reproduction of a phototaken image (on a personal computer or by a printer). The effective image pickup plane shown in FIG. 8 is set at an area narrower than the total photoelectric conversion surface on the image pickup device, depending on the performance of the optical system used (an image circle that can be ensured by the performance of the optical system). The diagonal length L of an effective image pickup plane is thus defined by that of this effective image pickup plane. Although the image pickup range used for image reproduction may be variable, it is noted that when the zoom lens of the invention is used on an image pickup system having such functions, the diagonal length L of its effective image pickup plane varies. In that case, the diagonal length L of the effective image pickup plane according to the invention is defined by the maximum value in the widest possible range for L.

The infrared cut means includes an infrared cut absorption filer and an infrared sharp cut coat. The infrared cut absorption filter is formed of a glass having an infrared absorber therein, and the infrared sharp cut coat cuts infrared rays by reflection rather than by absorption. Instead of this infrared cut absorption filter, it is thus acceptable to use a low-pass filter or dummy transparent plane plate with an infrared sharp cut coat applied directly thereon.

Preferable in this case, the near-infrared sharp cut coat is designed to have a transmittance of at least 80% at 600 nm wavelength and a transmittance of up to 10% at 700 nm wavelength. More specifically, the near-infrared sharp cut coat has a multilayer structure made up of such 27 layers as mentioned below; however, the design wavelength is 780 nm.

| Substrate | Material | Physical Thickness (nm) | λ/4 |
|---|---|---|---|
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |
| 18th layer | TiO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |
| Air | | | |

Figure 9:
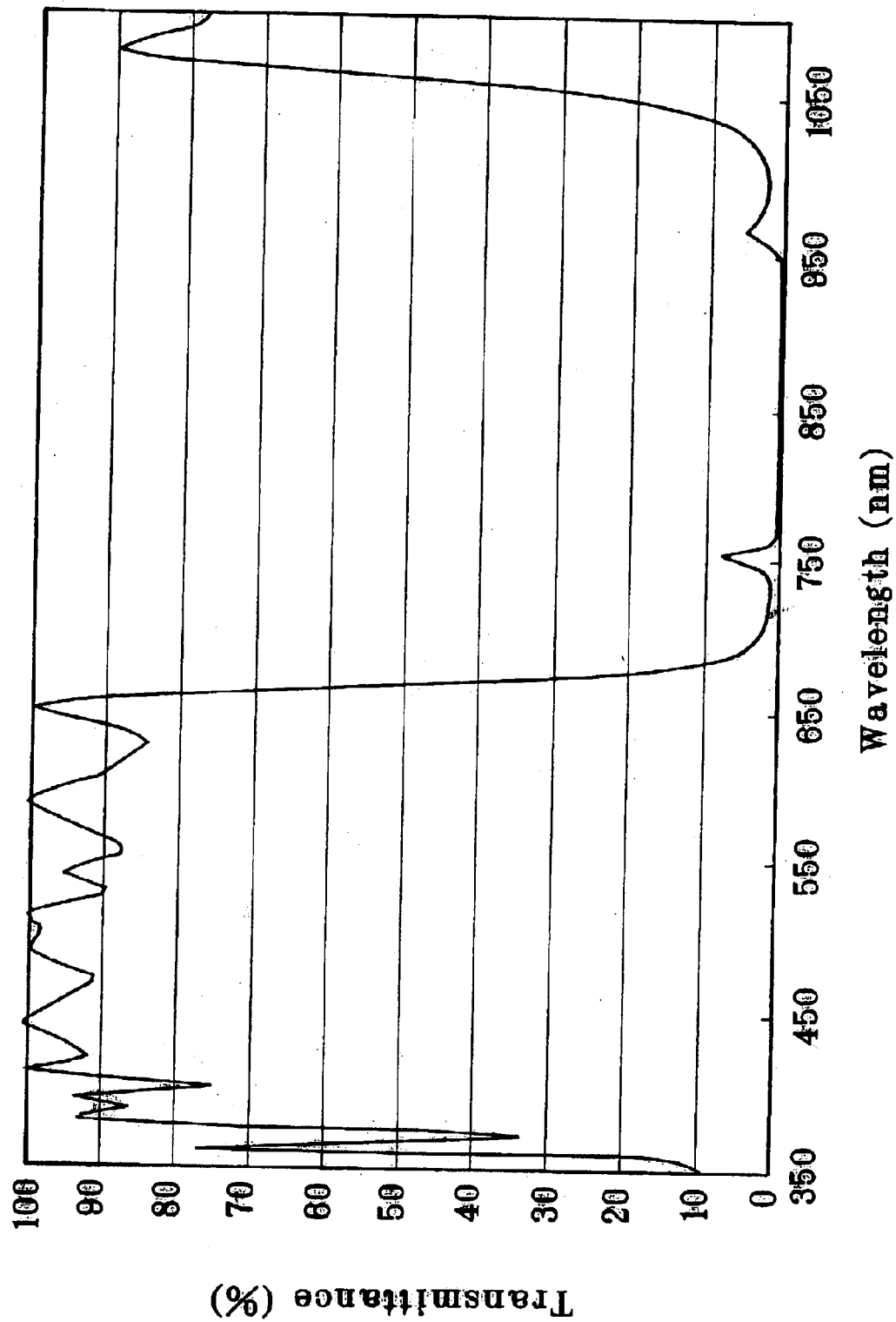
FIG. 9 is a diagram indicative of the transmittance characteristics of one example of the near-infrared sharp cut coat.

The aforesaid near-infrared sharp cut coat has such transmittance characteristics as shown in FIG. 9.

Figure 10:
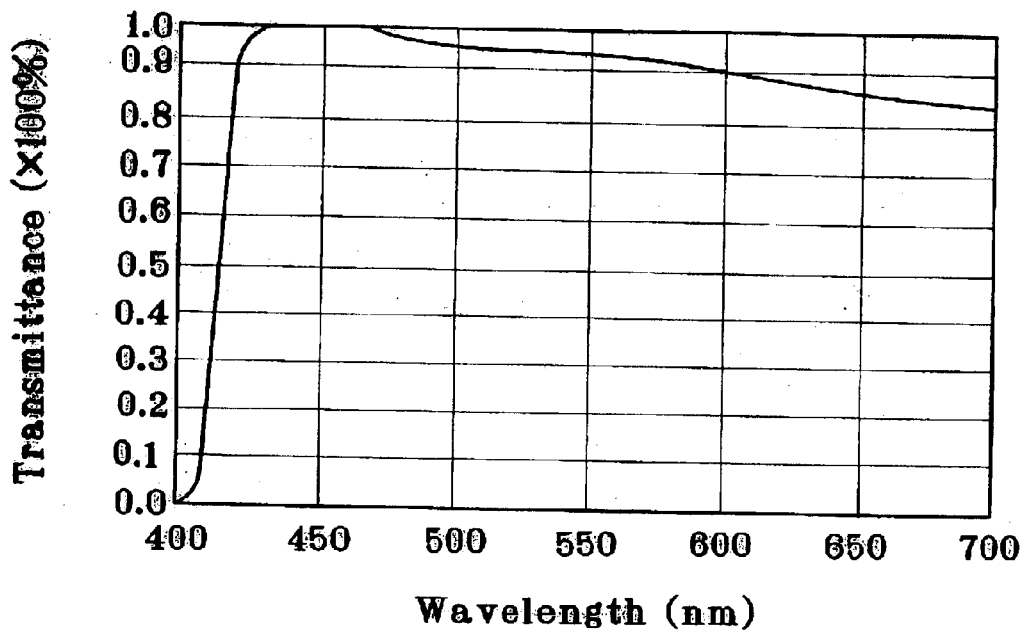
FIG. 10 is a diagram indicative of the transmittance characteristics of one example of the color filter located on the exit surface side of the low-pass filter.

The low-pass filter is provided on its exit surface side with a color filter or coat for reducing the transmission of colors at such a short wavelength region as shown in FIG. 10.

Preferably, that filter or coat should be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for image pickup systems using a complementary mosaic filter.

In each of the aforesaid examples, coating is applied in such a way that, as shown in FIG. 10, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by a μm in the horizontal direction and by SQRT(1/2)×a in the ±45° direction for the purpose of moiré control, wherein SQRT means a square root.

Figure 11:
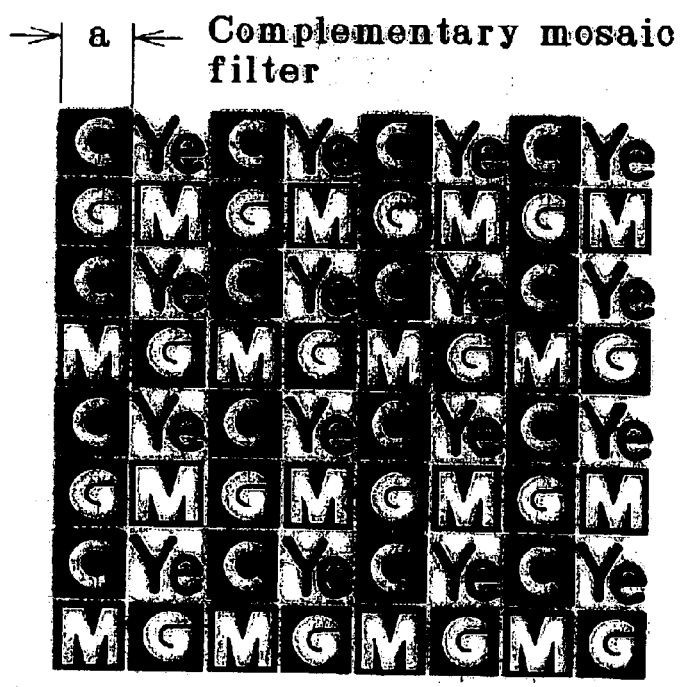
FIG. 11 is a schematic illustrative of how the color filter elements are arranged in the complementary colors filter.

The image pickup plane I of a CCD is provided thereon with a complementary mosaic filter wherein, as shown in FIG. 11, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary mosaic filter is composed of at least four different color filter elements as shown in FIG. 11, which should preferably have such characteristics as given below.

Each green color filter element G has a spectral strength peak at a wavelength $G_P$, each yellow filter element Ye has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

510 nm<$G_P$<540 nm 5 nm<$Y_P$–$G_P$<35 nm

–100 nm<$C_P$–$G_P$<–5 nm 430 nm<$M_{P1}$<480 nm 580 nm<$M_{P2}$<640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 12:
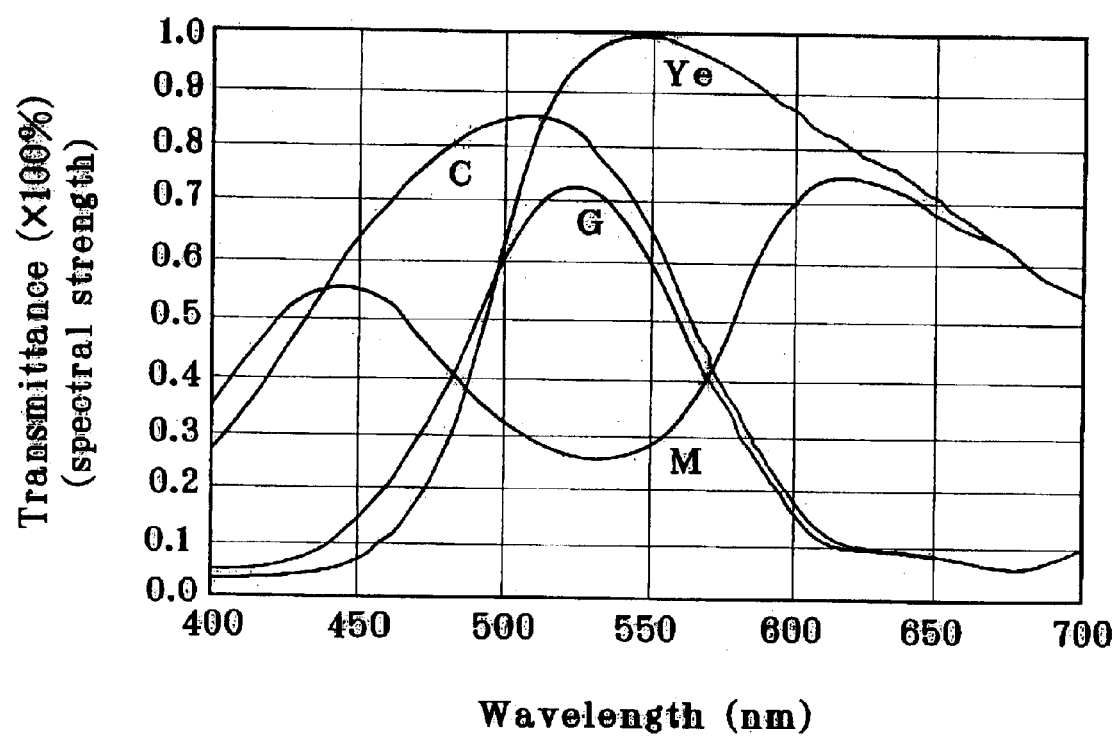
FIG. 12 is a diagram indicative of one example of the wavelength characteristics of the complementary mosaic filter.

One example of the wavelength characteristics in the aforesaid respective examples is shown in FIG. 12. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).
For luminance signals,
  $Y = |G+M+Y_e+C| \times 1/4$
For chromatic signals,
  $R-Y = |(M+Y_e)-(G+C)|$
  $B-Y = |(M+C)-(G+Y_e)|$
Through this signal processing, the signals from the complementary filter are converted into R (red), G (green) and B (blue) signals.

In this regard, it is noted that the aforesaid near-infrared sharp cut coat may be located anywhere on the optical path, and that the number of low-pass filters may be either two as mentioned above or one.

The electronic image pickup system constructed as described above may be applied to phototaking systems where object images formed through zoom lenses are received at image pickup devices such as CCDs, inter alia, digital cameras or video cameras as well as PCs and telephone sets which are typical information processors, in particular, easy-to-carry cellular phones. Given below are some such embodiments.

Figure 13:
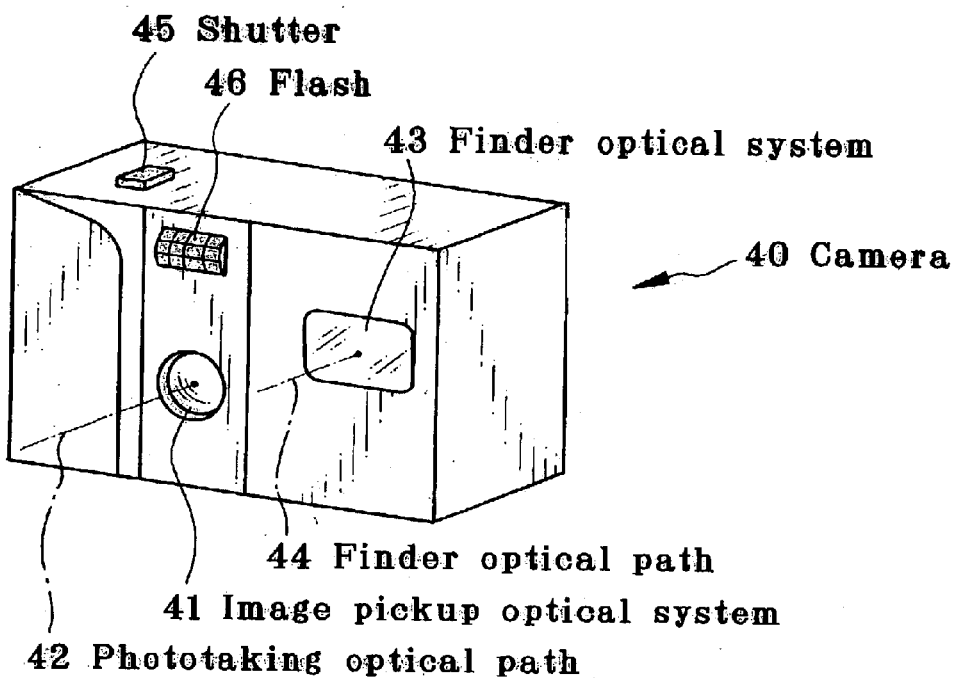
FIG. 13 is a front perspective schematic illustrative of the outside shape of a digital camera with the inventive zoom lens built therein.
Figure 14:
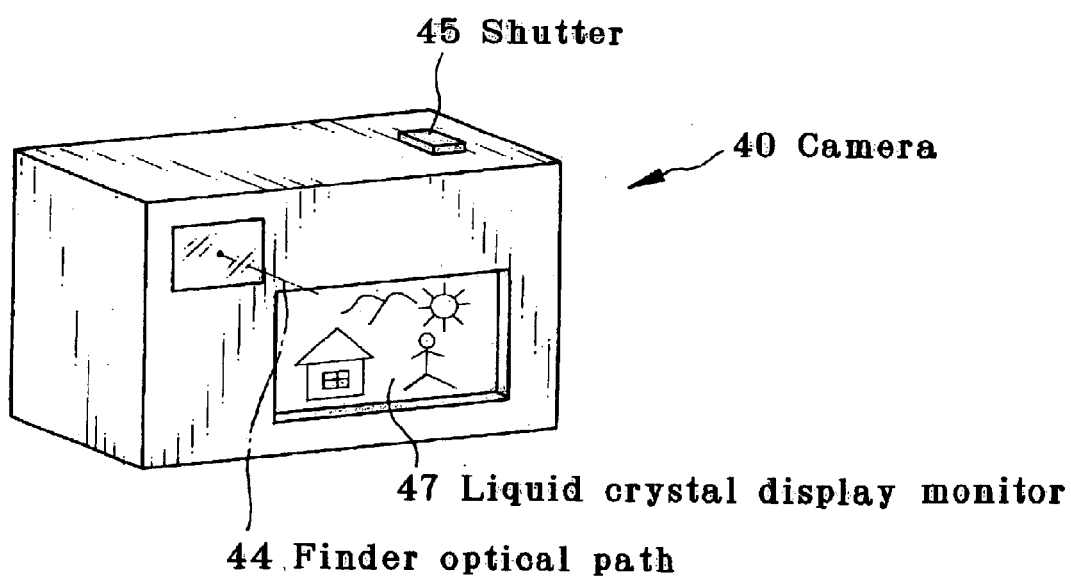
FIG. 14 is a rear perspective schematic of the digital camera of FIG. 13.
Figure 15:
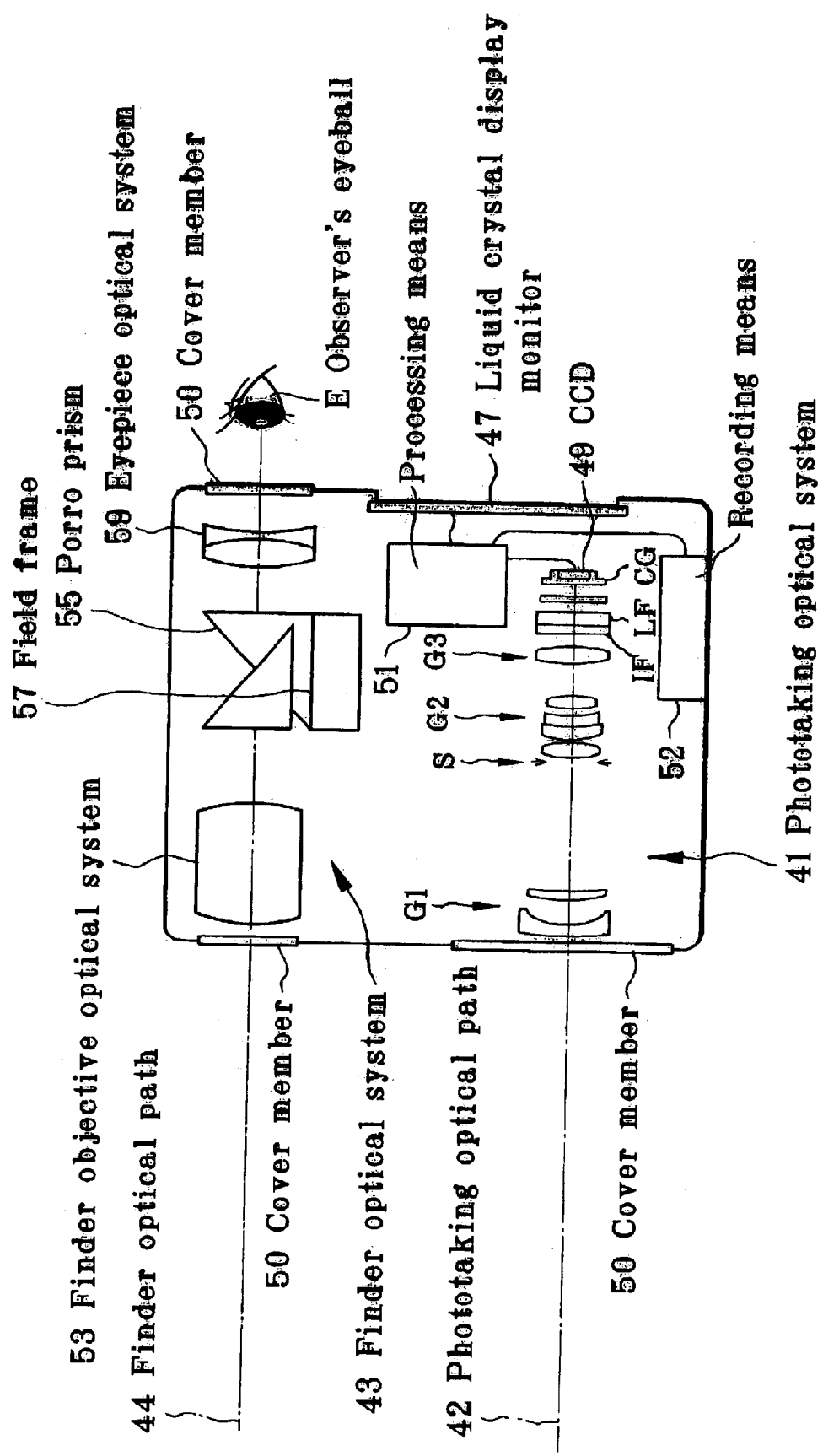
FIG. 15 is a sectional schematic of the digital camera of FIG. 13.

FIGS. 13, 14 and 15 are conceptual illustrations of a phototaking optical system 41 for digital cameras, in which the zoom lens of the invention is incorporated. FIG. 13 is a front perspective view of the outside shape of a digital camera 40, and FIG. 14 is a rear perspective view of the same. FIG. 15 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup plane of a CCD 49 via an optical low-pass filter F comprising a dummy transparent plane plate provided thereon with a near-infrared cut coat and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide camera in place of CCD 49.

Moreover, a finder objective optical system 53 is located on the finder optical path 44. An object image formed by the finder objective optical path 53 is in turn formed on the field frame 57 of a Porro prism 55 that is an image erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein.

In the embodiment of FIG. 15, plane-parallel plates are used as the cover members 50; however, it is acceptable to use powered lenses.

As can be appreciated from the foregoing explanation, the present invention can provide a zoom lens that is received in a lens mount with smaller thickness and efficiency, has high magnifications and is excellent in image-formation capability even on rear focusing, and enables video cameras or digital cameras to be thoroughly slimmed down.

What we claim is:

1. An image pickup system comprising a zoom lens and an image pickup plane located on an image side of the zoom lens, wherein:

said zoom lens comprises, in order from an object side of said zoom lens, a first lens group of negative refracting power comprising a negative lens element having an aspheric surface and a positive lens element, a second lens group comprising, in order from an object side thereof, a positive single lens element L21, a doublet component of positive refracting power wherein a positive lens element L22 and a negative lens element L23 are cemented together in this order and which is in a meniscus form convex toward the object side and a positive single lens element L24, wherein two or more surfaces except a cementing surface in said doublet component are each defined by an aspheric surface, and a third lens group composed of one positive lens component, wherein:

for zooming from a wide-angle end to a telephoto end of said zoom lens focused on an object point at infinity, said second lens group moves only toward the object side, said third lens group moves in a locus different from that of said second lens group, said third lens moves for focusing, and the following conditions (1) and (2) are satisfied:

$$-0.4 < (R_{21F}+R_{21R})/(R_{21F}-R_{21R}) < 0.3 \quad (1)$$

$$1.4 < -\beta_{2T} < 2.1 \quad (2)$$

where $R_{21F}$ is an axial radius of curvature of an object side-surface of the single lens element L21 in the second lens group, $R_{21R}$ is an axial radius of curvature of an image side-surface of the single lens element L21 in the second lens group, and $\beta_{2T}$ is a magnification of the second lens group at the telephoto end focused on an object point at infinity.

2. The image pickup system according to claim 1, wherein at least two of an object side-surface and an image side-surface of the single lens element L21 in said second lens group and an object side-surface of the positive lens element L22 in said second lens group are each defined by an aspheric surface.

3. The image pickup system according to claim 2, wherein only two of the object side-surface and the image side-surface of the single lens element L21 in said second lens group and the object side-surface of the positive lens element L22 in said second lens group are defined by an aspheric surface.

4. The image pickup system according to claim 1, wherein both an object side-surface and an image side-surface of the single lens element L21 in said second lens group are defined by aspheric surfaces, which are each displaced from a spherical surface having an axial radius of curvature toward the object side of the zoom lens.

5. The image pickup system according to claim 4, wherein an electronic image pickup device is located on said image pickup plane, and the following condition (3) is satisfied:

$$1.0 \times 10^{-4} \cdot L < |Asp21R| < |Asp21F| < 4.0 \times 10^{-3} \cdot L \tag{3}$$

where L is a diagonal length of an effective image pickup area of the electronic image pickup device, Asp21F is an amount of displacement, at a height of 0.3L from an optical axis, of the object-side aspheric surface of the single lens element L21 in the second lens group with respect to a spherical surface having an axial radius of curvature, and Asp21R is an amount of displacement, at a height of 0.3L from the optical axis, of the image-side aspheric surface of the single lens element L21 in the second lens group with respect to a spherical surface having an axial radius of curvature.

6. The image pickup system according to claim 1, wherein an electronic image pickup device is located on said image pickup plane, and the doublet component in said second lens group is configured in such a way as to satisfy the following conditions (4) and (5):

$$0.6 < R_{23R}/R_{22F} < 1.0 \tag{4}$$

$$0 < L/R_{23F} < 1.2 \tag{5}$$

where L is a diagonal length of an effective image pickup area of the electronic image pickup device, $R_{22F}$ is an axial radius of curvature of the object side-surface of the positive lens element L22 in the second lens group, $R_{23R}$ is an axial radius of curvature of the image side-surface of the negative lens group L23 in the second lens group, and $R_{23}F$ is an axial radius of curvature of a cementing surface of the doublet component in the second lens group.

7. The image pickup system according to claim 1, wherein said first lens group is composed of two lens elements or said negative lens element having an aspheric surface and said positive lens element.

8. The image pickup system according to claim 7, which further satisfies the following conditions (6) and (7):

$$20 < v_{11} - v_{12} \tag{6}$$

$$-8 < (R_{13} + R_{14})/(R_{13} - R_{14}) < -1.5 \tag{7}$$

where $v_{11}$ is an Abbe number on a d-line basis of a medium of the negative lens element in the first lens group, $v_{12}$ is an Abbe number on the d-line basis of a medium of the positive lens element in the first lens group, $R_{13}$ is an axial radius of curvature of the object side-surface of the positive lens element in the first lens group, and $R_{14}$ is an axial radius of curvature of the image side-surface of the positive lens element in the first lens group.

9. The image pickup system according to claim 7, wherein an electronic image pickup device is located on said image pickup plane, and the following condition (8) is satisfied:

$$0.2 < d_{11}/L < 0.65 \tag{8}$$

where L is a diagonal length of an effective image pickup area of the electronic image pickup device, and d11 is an axial air separation between the negative lens element and the positive lens element in the first lens group.

10. The image pickup system according to claim 1, wherein for zooming from the wide-angle end to the telephoto end focused on an object point at infinity, said third lens group moves toward the image side in a convex locus.

11. The image pickup system according to claim 1, wherein said third lens group is composed of one positive single lens element.

12. The image pickup system according to claim 1, wherein all refracting surfaces in said third lens group are defined by spherical surfaces.

13. The image pickup system according to claim 1, wherein an electronic image pickup device is located on said image pickup plane.

14. The image pickup system according to claim 13, wherein a diagonal length L of an effective image pickup area of said image pickup device complies with the following condition:

3.0 mm<L<12.0 mm.

15. An image pickup system comprising a zoom lens and an image pickup plane located on an image side of the zoom lens, wherein:

said zoom lens comprises, in order from an object side of said zoom lens, a first lens group of negative refracting power comprising a negative lens component having an aspheric surface and a positive lens component, a second lens group composed of, in order from an object side thereof, a positive single lens element L21, a doublet component of positive refracting power wherein a positive lens element L22 and a negative lens element L23 are cemented together in this order and which is in a meniscus form convex toward the object side and a positive single lens element L24, wherein two or more surfaces except a cementing surface in said doublet component are each defined by an aspheric surface, and a third lens group comprising a positive lens component, wherein:

for zooming from a wide-angle end to a telephoto end of said zoom lens focused on an object point at infinity, said second lens group moves only toward the object side, said third lens group moves in a locus different from that of said second lens group, said third lens moves for focusing, and the following conditions (1) and (2) are satisfied:

$$-0.4 < (R_{21F} + R_{21R})/(R_{21F} - R_{21R}) < 0.3 \tag{1}$$

$$1.4 < -\beta_{2T} < 2.1 \tag{2}$$

where $R_{21F}$ is an axial radius of curvature of an object side-surface of the single lens element L21 in the second lens group, $R_{21R}$ is an axial radius of curvature of an image side-surface of the single lens element L21 in the second lens group, and $\beta_{2T}$ is a magnification of the second lens group at the telephoto end focused on an object point at infinity.

16. The image pickup system according to claim 15, wherein said first lens group is composed of two lens components or said negative lens component having an aspheric surface and said positive lens component.

17. The image pickup system according to claim 15, wherein all refracting surfaces in said third lens group are defined by spherical surfaces.

18. The image pickup system according to claim 15, wherein an electronic image pickup device is located on said image pickup plane.

19. The image pickup system according to claim 15, wherein a diagonal length L of an effective image pickup area of said image pickup device complies with the following condition:

3.0 mm<L<12.0 mm.

* * * * *

UNITED STATES PATENT AND TRADEMARK OFFICE
CERTIFICATE OF CORRECTION

PATENT NO. : 6,856,467 B2
DATED : February 15, 2005
INVENTOR(S) : Iyama

It is certified that error appears in the above-identified patent and that said Letters Patent is hereby corrected as shown below:

Column 5,
Line 49, change "$2.0 \times 10^{-4} \cdot L < Asp21R < |Asp21F| < 2.0 \times 10^{-3} \cdot L$" to -- $2.0 \times 10^{-4} \cdot L < Asp21R| < |Asp21F| < 2.0 \times 10^{-3} \cdot L$ --.

Column 6,
Line 20, change "(5)" to -- (5)' --.

Column 7,
Line 4, change "(6)" to -- (6)" --.

Column 9,
Lines 6 and 12, change "$\geqq$" to -- $\leqq$ --.
Lines 8, 14 and 26, change "$\leqq$" to -- $\geqq$ --.
Line 24, change "$\geqq 0.004$" to -- $\leqq 0.004$ --.

Signed and Sealed this

Fifteenth Day of November, 2005

JON W. DUDAS
*Director of the United States Patent and Trademark Office*